(12) United States Patent
Sethi et al.

(10) Patent No.: US 12,482,860 B2
(45) Date of Patent: Nov. 25, 2025

(54) SYSTEM AND METHOD FOR IMPROVED BATTERY STRUCTURAL PROPERTIES

(71) Applicant: Anthro Energy, Inc., San Jose, CA (US)

(72) Inventors: Gurmukh Sethi, San Jose, CA (US); Qi Zheng, San Jose, CA (US); David George Mackanic, San Jose, CA (US); Joseph K. Papp, San Jose, CA (US)

(73) Assignee: Anthro Energy, Inc., San Jose, CA (US)

( * ) Notice: Subject to any disclaimer, the term of this patent is extended or adjusted under 35 U.S.C. 154(b) by 0 days.

(21) Appl. No.: 18/928,887

(22) Filed: Oct. 28, 2024

(65) Prior Publication Data
US 2025/0149631 A1    May 8, 2025

Related U.S. Application Data

(60) Provisional application No. 63/593,686, filed on Oct. 27, 2023.

(51) Int. Cl.
H01M 10/0565 (2010.01)
H01M 50/411 (2021.01)
(Continued)

(52) U.S. Cl.
CPC ..... *H01M 10/0565* (2013.01); *H01M 50/411* (2021.01); *H01M 50/414* (2021.01);
(Continued)

(58) Field of Classification Search
CPC ..... H01M 10/0565; H01M 2300/0082; H01M 2300/0085; H01M 10/0569;
(Continued)

(56) References Cited

U.S. PATENT DOCUMENTS 3,732,288 A    5/1973    Coon et al.
4,410,597 A   10/1983    Nishino et al.
(Continued)

FOREIGN PATENT DOCUMENTS

CN    110085906 A    8/2019
CN    115020804 A    9/2022
(Continued)

OTHER PUBLICATIONS

"Acrylate Monomers and Oligomers", NAGASE America LLC, first downloaded Feb. 15, 2024.
(Continued)

*Primary Examiner* — Laura Weiner
(74) *Attorney, Agent, or Firm* — Jeffrey Schox; Randy Mehlenbacher

(57) ABSTRACT

A polymer electrolyte can be formed from (e.g., by polymerizing) a mixture that includes oligomer(s), additive(s), solvent(s), salt(s), and/or any suitable components. The polymer electrolyte can further or alternatively include monomer(s) (e.g., a stiffening monomer that in solution or incorporated into a cured polymer modifies a mechanical property such as flexural modulus of the battery cell; adhesion monomers such as a monomer that interacts with one or more surface within a battery to modify or improve adhesion of the electrolyte and the surface; etc.).

6 Claims, 4 Drawing Sheets

(51) Int. Cl.
 *H01M 50/414* (2021.01)
 *H01M 50/42* (2021.01)
 *H01M 10/0525* (2010.01)
 *H01M 10/0567* (2010.01)
 *H01M 10/0568* (2010.01)
 *H01M 10/0569* (2010.01)
 *H01M 50/409* (2021.01)

(52) U.S. Cl.
 CPC ........ *H01M 50/42* (2021.01); *H01M 10/0525* (2013.01); *H01M 10/0567* (2013.01); *H01M 10/0568* (2013.01); *H01M 10/0569* (2013.01); *H01M 50/409* (2021.01); *H01M 2300/0028* (2013.01); *H01M 2300/0034* (2013.01); *H01M 2300/0082* (2013.01); *H01M 2300/0085* (2013.01)

(58) Field of Classification Search
 CPC ......... H01M 10/0568; H01M 10/0567; H01M 2300/0028; H01M 2300/0034; H01M 10/0525; H01M 50/414; H01M 50/42; H01M 50/411
 See application file for complete search history.

(56) References Cited

U.S. PATENT DOCUMENTS

| | | |
|---|---|---|
| 5,549,987 A | 8/1996 | Venugopal et al. |
| 7,026,071 B2 | 4/2006 | Mayes et al. |
| 7,097,940 B2 | 8/2006 | Uetani et al. |
| 7,422,826 B2 | 9/2008 | Xing et al. |
| 7,651,820 B2 | 1/2010 | Shibuya |
| 8,323,838 B2 | 12/2012 | Shembel et al. |
| 8,815,453 B1 | 8/2014 | Tsukamoto |
| 9,130,242 B2 | 9/2015 | Jeon et al. |
| 9,225,037 B2 | 12/2015 | Sugimoto et al. |
| 9,843,073 B2 | 12/2017 | Yoneda et al. |
| 10,090,556 B2 | 10/2018 | Rho et al. |
| 10,256,497 B2 | 4/2019 | Shinmei et al. |
| 10,276,891 B2 | 4/2019 | Barde et al. |
| 10,326,166 B2 | 6/2019 | Yang et al. |
| 10,472,571 B2 | 11/2019 | Zhang et al. |
| 10,566,658 B2 | 2/2020 | Solan et al. |
| 10,615,398 B2 | 4/2020 | Oh et al. |
| 10,707,527 B2 | 7/2020 | Lee et al. |
| 10,854,923 B2 | 12/2020 | Xu et al. |
| 11,127,980 B2 | 9/2021 | Zhang et al. |
| 11,784,315 B2 | 10/2023 | Jung et al. |
| 11,799,087 B2 | 10/2023 | Morin et al. |
| 11,824,156 B2 | 11/2023 | Dong et al. |
| 2002/0012850 A1 | 1/2002 | Schmidt et al. |
| 2002/0048706 A1 | 4/2002 | Mayes et al. |
| 2003/0108799 A1 | 6/2003 | Lascaud et al. |
| 2005/0136093 A1 | 6/2005 | Denk |
| 2007/0045596 A1 | 3/2007 | King et al. |
| 2008/0076026 A1 | 3/2008 | Ryu et al. |
| 2008/0099734 A1 | 5/2008 | Chiang et al. |
| 2009/0029250 A1 | 1/2009 | Stebani et al. |
| 2009/0246625 A1 | 10/2009 | Lu |
| 2009/0317723 A1 | 12/2009 | Yu et al. |
| 2010/0092870 A1 | 4/2010 | Shembel et al. |
| 2011/0151337 A1 | 6/2011 | Kim et al. |
| 2012/0070750 A1 | 3/2012 | Blanc et al. |
| 2014/0079988 A1 | 3/2014 | Han |
| 2014/0088223 A1 | 3/2014 | Leibler et al. |
| 2015/0056517 A1 | 2/2015 | Zhou et al. |
| 2015/0255227 A1 | 9/2015 | Chen et al. |
| 2016/0268627 A1 | 9/2016 | Lee et al. |
| 2017/0062830 A1 | 3/2017 | Bao et al. |
| 2017/0279122 A1 | 9/2017 | Helms et al. |
| 2018/0034101 A1 | 2/2018 | Lee et al. |
| 2018/0170009 A1 | 6/2018 | Kuniyasu |
| 2018/0330844 A1 | 11/2018 | Aetukuri et al. |
| 2019/0010288 A1 | 1/2019 | Lee et al. |
| 2020/0017649 A1 | 1/2020 | Agrawal et al. |
| 2020/0161706 A1 | 5/2020 | Cao et al. |
| 2021/0020944 A1 | 1/2021 | Tu et al. |
| 2021/0028488 A1 | 1/2021 | Lee et al. |
| 2021/0050597 A1 | 2/2021 | Lin et al. |
| 2021/0280946 A1 | 9/2021 | Jin et al. |
| 2021/0359342 A1 | 11/2021 | Park et al. |
| 2022/0085410 A1 | 3/2022 | Ahn et al. |
| 2022/0115692 A1 | 4/2022 | Mackanic et al. |
| 2022/0223926 A1 | 7/2022 | He et al. |
| 2022/0344712 A1 | 10/2022 | Su et al. |
| 2023/0117171 A1 | 4/2023 | Bao et al. |
| 2024/0283016 A1 | 8/2024 | Mackanic et al. |
| 2024/0387874 A1 | 11/2024 | Xu et al. |
| 2024/0405286 A1 | 12/2024 | Cao et al. |

FOREIGN PATENT DOCUMENTS

| | | |
|---|---|---|
| CN | 113471526 B | 12/2022 |
| CN | 116666745 A | 8/2023 |
| EP | 2495797 A1 | 9/2012 |
| EP | 3257099 A1 | 12/2017 |
| EP | 3407413 A1 | 11/2018 |
| EP | 4088338 A1 | 11/2022 |
| JP | H08321311 A | 12/1996 |
| JP | 9-278971 | * 10/1997 |
| JP | 11-149822 | * 6/1999 |
| JP | 2000294281 A | 10/2000 |
| JP | 2001307776 A | 11/2001 |
| JP | 2002511179 A | 4/2002 |
| JP | 2002208311 A | 7/2002 |
| JP | 2004059865 A | 2/2004 |
| KR | 20140115236 A | 9/2014 |
| KR | 20170142927 A1 | 12/2017 |
| KR | 102566405 B1 | 8/2023 |
| WO | 2020060293 A1 | 3/2020 |
| WO | 2020096343 A1 | 5/2020 |
| WO | 2022255598 A1 | 12/2022 |
| WO | 2023002015 A1 | 1/2023 |
| WO | 2023063727 A1 | 4/2023 |
| WO | 2023090449 A1 | 5/2023 |

OTHER PUBLICATIONS

"Advanced Performance UV/EB-Curing Oligomers", Bomar, https://bomar-chem.com/products/oligomers.

"Battery Tab Material for Lithium-ion Cell Manufactures, Lithium-ion Battery Tabs", https://www.avocetsteel.co.uk/applications/li-ion-batteries/avocet-battery-tabs/, first downloaded 18-Jun. 2024.

"Battery Tab Materials for Lithium-Ion Cell Manufacturers", Targay, https://www.targray.com/li-ion-battery/packaging-materials/tabs, first downloaded Jun. 13, 2024.

"Causes and effects of tab folding during lithium battery manufacturing process", Topower, https://www.sztaipu.com/techcorner/other/causes-and-effects-of-tab-folding-during-lithium-battery-manufacturing-process/, Dec. 18, 2023.

"Diurethane dimethacrylate, mixture of isomers", https://www.sigmaaldrich.com/US/en/product/aldrich/436909, first downloaded Feb. 14, 2024.

"Flexible Battery", Softmatter, Toolkit, https://softmatter.io/shop/flexible-battery/, first downloaded Jun. 13, 2024.

"Flexible Lithium Polymer Battery", Jenax, https://jenaxinc.com/products/batteries/, first downloaded Jun. 13, 2024.

"Introducing FlexFrame", QuantumScape, https://www.quantumscape.com/blog/introducing-flexframe/, Jan. 16, 2024.

"Lithium difluoro(oxalato) borate", National Library of Medicine, available online at https://pubchem.ncbi.nlm.nih.gov/compound/Lithium-difluoro_oxalato_borate, date unknown.

"Oligomer", Study Smarter, https://www.studysmarter.co.uk/explanations/engineering/materials . . . consists%20of%20a%20few, typically%20between%20three%20and%20ten, first downloaded Feb. 14, 2024.

"Oligomer methacrylate resins", Arkem Global website, https://sartomer.arkema.com/en/products/product-families/specialty-methacrylates-resins/oligomers-methacrylate/, fist downloaded Feb. 14, 2024.

(56) References Cited

OTHER PUBLICATIONS

"Thermal Transitions of Homopolymers: Glass Transition & Melting Point", Millipore Sigma, https://www.sigmaaldrich.com/US/en/technical-documents/technical-article/materials-science-and-engineering/polymer-synthesis/thermal-transitions-of-homopolymers, first downloaded Oct. 13, 2023.
Alhalili, Zahrah, "Metal Oxides Nanoparticles: General Structural Description, Chemical, Physical, and Biological Synthesis Methods, Role in Pesticides and Heavy Metal Removal through Wastewater Treatment", Molecules 2023, 28, 3086. https:// doi.org/10.3390/molecules28073086.
Burns, Barry, "Cyanoacrylates: Towards High Temperature Resistant Instant Adhesives. A Critical Review", Rev. Adhesion Adhesives, vol. 5, No. 4, Dec. 2017.
Chae, Wookil, et al., "A Brief Review of Gel Polymer Electrolytes Using In Situ Polymerization for Lithium-ion Polymer Batteries", Polymers 2023, 15, 803. https://doi.org/10.3390/ polym 15040803, published Feb. 5, 2023.
Ervithayasuporn, Vuthichai, et al., "Synthesis and Isolation of Methacrylate- and Acrylate-Functionalized Polyhedral Oligomeric Silsesquioxanes (T8, T10, and T12) and Characterization of the Relationship between Their Chemical Structures and Physical Properties", Inorganic Chemistry, vol. 52/Issue 22, Oct. 31, 2013.
Gnanaraj, J.S., et al., "LiPF3 (CF2CF3)3: A Salt for Rechargeable Lithium Ion Batteries", Journal of The Electrochemical Society, 150 (4) A445-A454 (2003), Available electronically Feb. 28, 2003.
Guo, Liya, et al., "Degradation in lithium ion battery current collectors", J. Phys. Energy 3 (2021) 032015, published Jul. 15, 2021.
Hosseinioun A., et al., "In situ crosslinked PM MA gel electrolyte from a low viscosity precursor solution for cost-effective, long lasting and sustainable lithium-ion batteries", Journal of Membrane Science, 594 (2020) 117546 (Year: 2020).
Kaden, Nicolaj, et al., "A Systematic Literature Analysis on Electrolyte Filling and Wetting in Lithium-Ion Battery Production", Batteries2023,9,164. https:// doi.org/10.3390/batteries9030164, published Mar. 9, 2023.
Liu, Wei, et al., "Flexible and Stretchable Energy Storage: Recent Advances and Future Perspectives", Adv. Mater. 2016.
Liu, Tong, et al., "Tailored PVDF Graft Copolymers via ATRP as High-Performance NCM811 Cathode Binders", ACS Materials Lett. 2023, 5, 2594-2603.
Lopez, Jeffrey, et al., "A Dual-Crosslinking Design for Resilient Lithium-Ion Conductors", Adv. Mater. 2018, 1804142.
Lopez, Jeffrey, et al., "Designing polymers for advanced battery chemistries", Nat Rev Mater 4, 312-330 (2019), Published: Apr. 3, 2019.
Mackanic, David G., et al., "Crosslinked Poly(tetrahydrofuran) as a Loosely Coordinating Polymer Electrolyte", Adv. Energy Mater. 2018, 1800703.
Mackanic, David G., "Decoupling of mechanical properties and ionic conductivity in supramolecular lithium ion conductors", Nature Communications, (2019) 10:5384, published Nov. 26, 2019.
Mackanic, David G., et al., "Enabling Deformable and Stretchable Batteries", Adv. Energy Mater. 2020, 2001424.
Mathias, Lon J., et al., "Synthesis of New Hydroxylated Monomers Based on Methacrylate, Dimethacrylate, and Tetramethacrylate Michael Adducts and Photopolymerization Kinetics of Bulk Cross-Linkers", Macromolecules 2004, vol. 37, No. 9, 3231-3238.
McGuire, Matthew, et al., "Flexibility Battery", U.S. Appl. No. 18/779,553, filed Jul. 22, 2024.
Schmidt, M., et al., "Lithium fluoroalkylphosphates: a new class of conducting salts for electrolytes for high energy lithium-ion batteries", Journal of Power Sources 97-98 (2001) 557-560, received Jun. 20, 2000; accepted Dec. 30, 2000.
Swiderski, Kenneth W., et al., "Urethane Acrylate Oligomers and UV/EB Curing: A Disruptive Technology for Traditional Urethane Prepolymers", Bomar, https://bomar-chem.com/content/download/312/file/BWP013DA%20Urethane%20Acrylate%20Oligomers%20and%20UV%20EB%20Curing%20White%20Paper.pdf, first downloaded 14-Feb. 2024, bomar-chem.com was first indexed by Google in Oct. 2020.
Wang, Ting, et al., "A PEGylated PVDF Antifouling Membrane Prepared by Grafting of Methoxypolyethylene Glycol Acrylate in Gama-Irradiated Homogeneous Solution", Materials 2024, 17,873. https://doi.org/ 10.3390/ma17040873.
Wood, David L., et al., "Prospects for reducing the processing cost of lithium ion batteries", Journal of Power Sources 275 (2015) 234-242, Nov. 6, 2014.
Wu, Qian, et al., "Flexible Nanocomposite Polymer Electrolyte Based on UV-Cured Polyurethane Acrylate for Lithium Metal Batteries", ACS Sustainable Chem. Eng. 2021, 9, 5631-5641, Apr. 12, 2021.
Yang, Junfeng, et al., "Self-healing strategy for Si nanoparticles towards practical application as anode materials for Li-ion batteries", Electrochemistry Communications 87 (2018) 22-26, available online Dec. 21, 2017.
Yu, Zhiao, et al., "Molecular design for electrolyte solvents enabling energy-dense and long-cycling lithium metal batteries", Nature Energy, 5, 526-533 (2020). https://doi.org/10.1038/s41560-020-0634-5.
Zhang, Guangzhao, et al., "A Quadruple-Hydrogen-Bonded Supramolecular Binder for High-Performance Silicon Anodes in Lithium-Ion Batteries", Small, vol. 14, No. 29, 22-Jun. 2018, p. 1801189.
Zhou, Binghua, et al., "A flexible, self-healing and highly stretchable polymer electrolyte via quadruple hydrogen bonding for lithium-ion batteries", J. Mater. Chem. A, 2018, 6, 11725.
Zhou, Guodong, et al., "In situ formation of poly(butyl acrylate)-based non-flammable elastic quasi-solid electrolyte for dendrite-free flexible lithium metal batteries with long cycle life for wearable devices", Journal Pre-proof, Energy Storage Materials, received Sep. 03, 2020, https://doi.org/10.1016/j.ensm.2020.10.012.
Zhou, Binghua, et al., "Self-healing composite polymer electrolyte formed via supramolecular networks for high-performance lithium-ion batteries", Journal of Materials Chemistry A, Issue 17, 2019.
Zhou, Binghua, et al., "Self-Healing Polymer Electrolytes Formed via Dual-Networks: A New Strategy for Flexible Lithium Metal Batteries", Chem. Eur. J. 2018, 24, 19200-19207.
Borghini, Maria Chiara, et al., "Investigation on lithium/polymer electrolyte interface for high performance lithium rechargeable batteries", Journal of Power Sources 68 (1997) 52-58.
Le Nest, Jean-Francois, et al., "Crosslinked Polyethers as Media for Ionic Conduction", British Polymer Journal 20 (1988) 253-268.
MacFarlane, D. R., et al., "Structure-Property Relationships in Plasticized Solid Polymer Electrolytes", Ekrrochimica Acu. Vol. 40, No. 13 14. pp. 2131-2136. 1995.
Meyer, Wolfgang H., "Polymer Electrolytes for Lithium-Ion Batteries", Adv. Mater. 1998, 10, No. 6.
Velankar, Sachin, et al., "High-Performance UV-Curable Urethane Acrylates via Deblocking Chemistry", Journal of Applied Polymer Science, vol. 62, 1361-1376(1996).
Lv, et al., "Flexible Solid Electrolyte Based on UV Cured Polyurethane Acrylate/Succinonitrile-Lithium Salt Composite Compatibilized by Tetrahydrofuran", Mar. 28, 2017, Composites Part B, 120, pp. 35-41 (Year: 2017).
Tuan, et al., "Enhancement of Plasticizing Effect on Bio-Based Polyurethane Acrylate Solid Polymer Electrolyte and Its Propertie", 2018, Polymers, 10, pp. 1-16 (Year: 2018).
Quek, et al., "Reversible addition-fragmentation chain transfer synthesis of amidine-based, CO2-responsive homo and AB diblock (Co)polymers comprised of histamine and their gas-triggered self-assembly in water", Journal of Polymer Science, Part A, vol. 51, No. 2, Jan. 15, 2013, published online Oct. 29, 2021, DOI: 10.1002/pola.26397, p. 394-404, p. 398, scheme 1.
"What are the additives to improve battery safety performance?", Tycorun, https://www.tycorun.com/blogs/news/what-are-the-additives-to-improve-battery-safety-performance, Jun. 23, 2020.
Amanchukwu, et al., "A New Class of Ionically Conducting Fluorinated Ether Electrolytes with High Electrochemical Stability", J. Am. Chem. Soc. 2020, 142, 7393-7403.

(56) References Cited

OTHER PUBLICATIONS

Cao, et al., "Review-Localized High-Concentration Electrolytes for Lithium Batteries", Journal of The Electrochemical Society, 2021, 168, 010522.
Fan, et al., "All-temperature batteries enabled by fluorinated electrolytes with non-polar solvents", Nature Energy, vol. 4, pp. 882-890 (2019).
Gribble, et al., "System and Method for Improved Battery Safety", U.S. Appl. No. 19/184,705, filed Apr. 21, 2025.
Moon, et al., "Non-fluorinated non-solvating cosolvent enabling superior performance of lithium metal negative electrode battery", Nature Communications (2022) 13:4538.
Vancoillie, et al., "Thermoresponsive poly(oligo ethylene glycol acrylates)", Progress in Polymer Science, 2014.
Yang, et al., "Localized High-Concentration Electrolyte (LHCE) for Fast Charging Lithium-Ion Batteries", Batteries 2023, 9, 155. https://doi.org/10.3390/batteries9030155, Feb. 28, 2023.
Yi, et al., "Safe electrolyte for long-cycling alkali-ion batteries", Nature Sustainability 7, 326-337 (2024).
Zhou, et al., "Energy Applications of Ionic Liquids: Recent Developments and Future Prospects", Chem. Rev. 2023, 123, 12170-12253.
Markevich, et al., "Fluoroethylene Carbonate as an Important Component for the Formation of an Effective Solid Electrolyte Interphase on Anodes and Cathodes for Advanced Li-Ion Batteries", ACS Energy Lett. 2017, 2, 1337-1345.

\* cited by examiner

SYSTEM AND METHOD FOR IMPROVED BATTERY STRUCTURAL PROPERTIES

CROSS-REFERENCE TO RELATED APPLICATIONS

This application claims the benefit of U.S. Provisional Application No. 63/593,686 filed 27 Oct. 2023, which is incorporated in its entirety by this reference.

This application is related to U.S. application Ser. No. 18/443,695 filed 16 Feb. 2024 and U.S. application Ser. No. 18/443,716 filed 16 Feb. 2024, each of which is incorporated in its entirety by this reference.

TECHNICAL FIELD

This invention relates generally to the battery field, and more specifically to a new and useful system and method in the battery field.

DETAILED DESCRIPTION

The following description of the embodiments of the invention is not intended to limit the invention to these embodiments, but rather to enable any person skilled in the art to make and use this invention.

1. Overview

Figure 1:
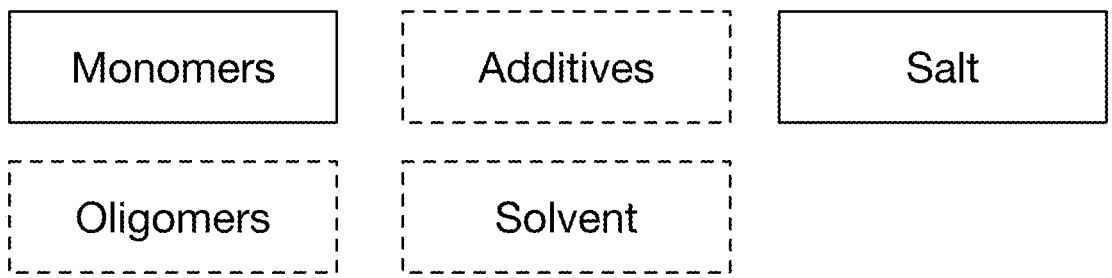
FIG. 1 is a schematic representation of a formulation.

As shown in FIG. 1, a formulation for a polymer electrolyte can include monomer(s), oligomer(s), additive(s), solvent(s), salt(s), and/or any suitable components. The monomer(s) are preferably structural monomers (e.g., a monomer that in solution or incorporated into a cured polymer modifies a mechanical property of the battery cell such as to increase the battery cell flexural modulus, decrease the battery cell flexural modulus, etc.) and/or adhesion monomers (e.g., a monomer that interacts with one or more surface within a battery to modify or improve adhesion of the polymer and the surface). However, other suitable monomers can be used.

The formulation is preferably used within a battery (e.g., a battery as shown for example in FIG. 2A or FIG. 2B that can include a cathode current collector, a cathode, a separator, an electrolyte, an anode, an anode current collector, etc.) to form a battery with a polymeric electrolyte (e.g., gel-polymer electrolyte). However, the formulation could be used in a capacitor, fuel cell, electrolyzer, and/or in any suitable system.

2. Technical Advantages

Variants of the technology can confer one or more advantages over conventional technologies.

Figure 5A:
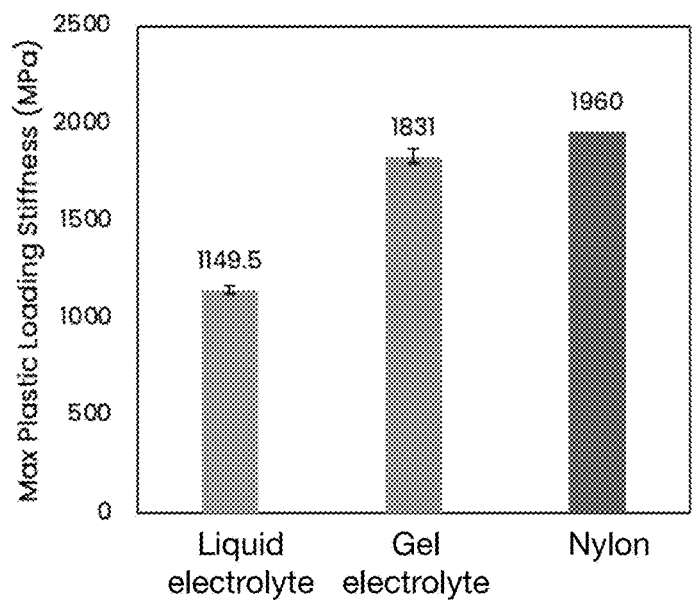
FIGS. 5A and 5B are graphical representations of (maximum or average, respectively) plastic loading stiffness for exemplary battery cells including a liquid electrolyte or a gel electrolyte.
Figure 5B:
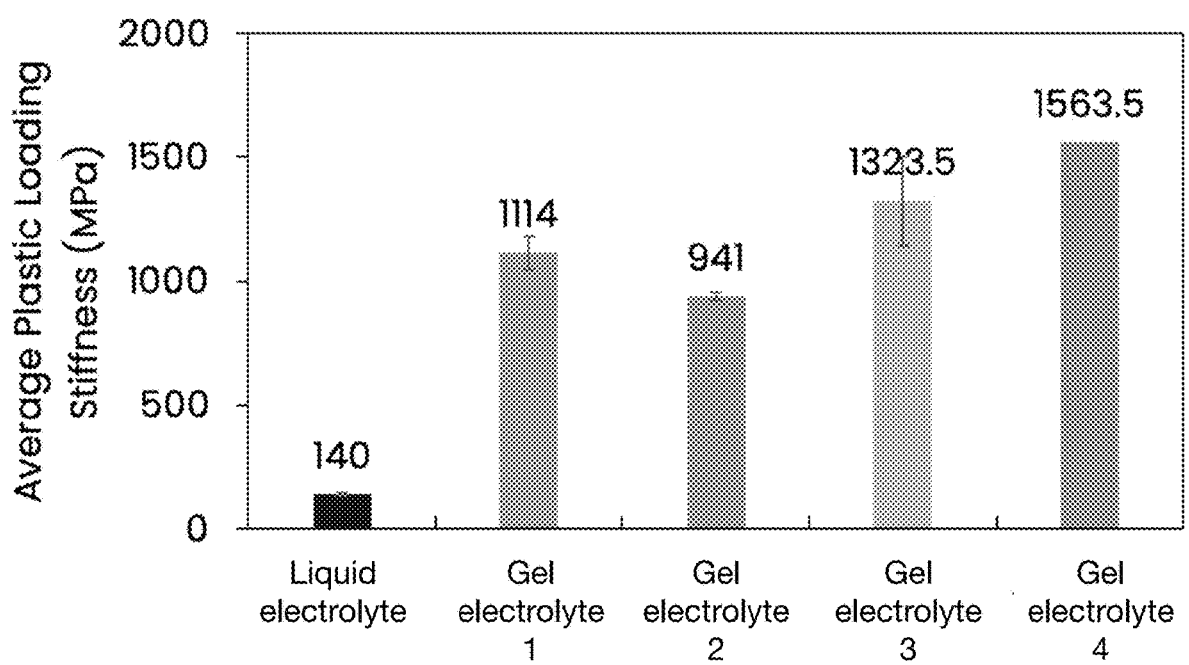
Figure 6:
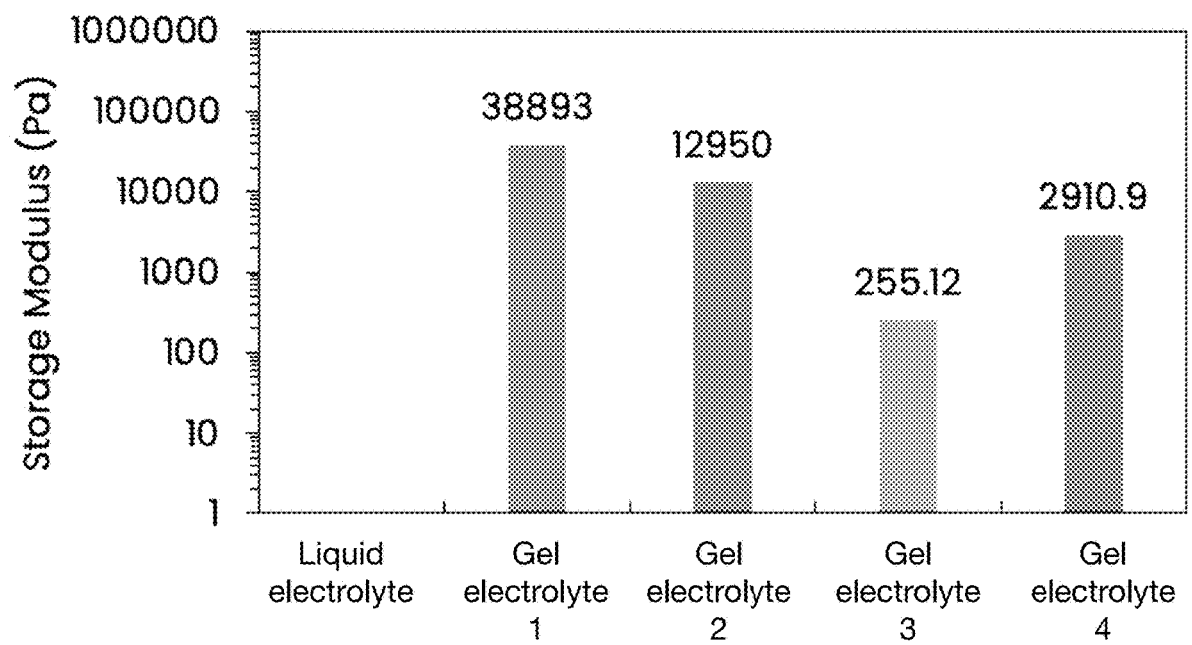
FIG. 6 is a graphical representation of storage modulus for exemplary battery cells including a liquid electrolyte or gel electrolyte.

First, variants of the technology that include structural monomers in the formulation (and thereby incorporate the structural monomers in the polymer after treatment of the formulation) can result in modified (and tunable) mechanical properties for the battery cell. For a particular battery cell design (e.g., for a given battery cell form factor, electrode composition, current collector thickness, separator thickness, electrode thickness, etc.), a battery cell that includes a polymer electrolyte can have an up to 50 times (e.g., 1.5×, 2×, 3×, 5×, 10×, 15×, 20×, 25×, 30×, 40×, etc.) greater flexural modulus or stiffness compared to a comparable battery with a liquid electrolyte (as shown for example in FIG. 5A, FIG. 5B, and FIG. 6). Relatedly by tuning the composition of the polymer electrolyte, the mechanical properties of the battery cell can be tuned across a range of flexural moduli or other relevant mechanical properties. These variants can be achieved, for example, by using one or more structural monomers (e.g., stiffening monomers, compliant monomers, etc.), by modifying a cross-linking density of the polymer electrolyte (e.g., based on the oligomer structure, based on the monomers, based on a method used to polymerize the oligomers and/or monomers, etc.), by using a stiff oligomer, and/or can otherwise be achieved. In related examples, the adhesion of the polymer electrolyte to components of the battery (e.g., adhesion to the current collector, separator, anode material, cathode material, etc. as measured for instance using a peel test) can similarly be modified. Variations of the technology can enable tuning of a flexural modulus of a battery (e.g., a pouch battery cell, a battery with aluminium laminate packaging, etc.) between about 200 MPa and 20 GPa. However, variations of the technology can achieve any suitable flexural modulus of the battery (e.g., depending on a target flexural modulus, application of the battery, etc.).

Second, variants of the technology can enable improved gravimetric or volumetric energy density (e.g., energy per unit mass or volume) battery cells. For instance, the improved stiffness of the battery cell can reduce the amount of housing material required, thereby lowering the total mass or volume of the battery cell (and consequently increasing the gravimetric or volumetric energy density).

Third, variants of the technology can enable battery electrodes (e.g., anodes and/or cathodes) that do not include (or include less than traditionally required such as <1% <2%, <4%, etc. by mass) binder. For instance, the use of an oligomer that includes a combination of binder monomers in addition to ionic conductively monomers can result in a polymer electrolyte (e.g., after curing) that acts as both binder and electrolyte (without substantially compromising the properties of the binder or electrolyte, resulting in enhanced binder or electrolyte properties from improved adhesion, etc.) and may reduce a cost of the battery cell.

However, further advantages can be provided by the system and method disclosed herein.

3. Battery

Figures 2A, 2B:
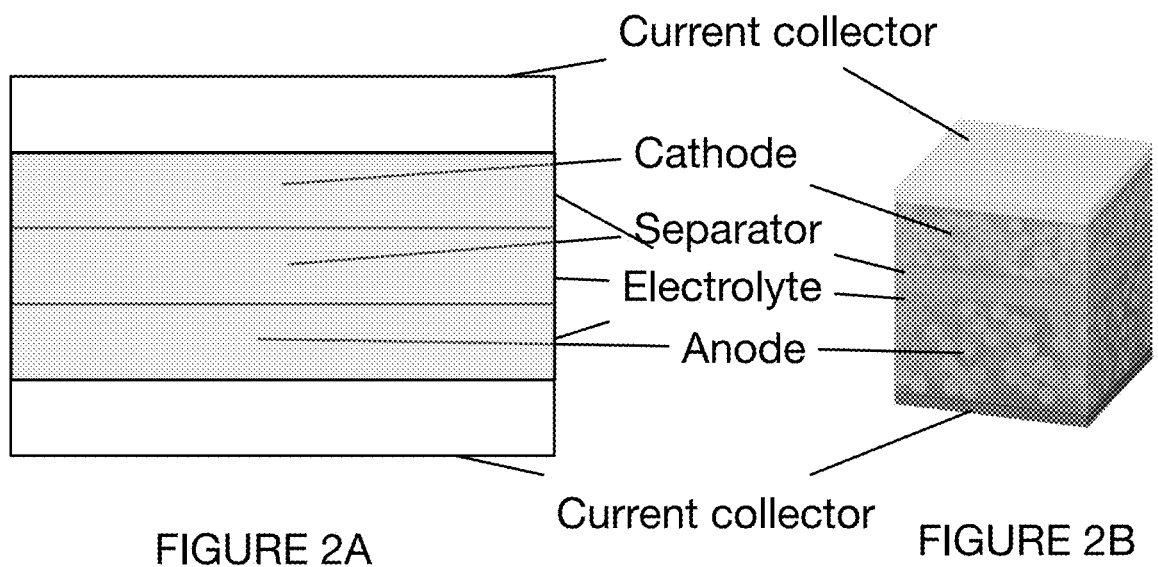
FIG. 2A is a schematic representation of an example of a battery.
FIG. 2B is a schematic representation of an example of a battery.

As shown for instance in FIG. 2A, a battery can include a current collector (e.g., a cathode current collector, an anode current collector, etc.), a cathode, a separator, an electrolyte, an anode, a housing, and/or any suitable components. The electrolyte is preferably a polymer-gel electrolyte (e.g., formed by treating a polymer electrolyte formulation as described below, physical gel, chemical gel, etc.), but can be any suitable electrolyte (e.g., a liquid electrolyte that includes safety monomers, safety oligomers, safety polymers, etc. without forming a gel throughout).

The current collector preferably functions as a support for and conducts electrons into and out of an electrode. For instance, a cathode current collector can support a cathode and an anode current collector can support an anode. The cathode current collector and anode current collector can be the same or different. The current collectors can be foil, foam, mesh, carbon coated, and/or be any type of current collector. The current collectors are typically made from aluminium (particularly common for the cathode), copper (particularly common for the anode), nickel, titanium, and/ or stainless steel. However, the current collects can be made of any material and/or have any form.

The cathode (e.g., material thereof) functions to undergo reduction during discharge (e.g., electrons enter the cathode during discharge and leave the cathode during charging). The cathode can include binders (e.g., to bind the cathode active material together, to bind the cathode active material to the current collector, etc.), cathode active material (e.g., the material that participates electrochemically), conductive material (e.g., to increase an electrical conductivity within the cathode active material, to improve shuttling of electrons between the current collector and the cathode active material, etc.), and/or can include any suitable material(s). The cathode active material is preferably a lithium-containing active material (e.g., lithium nickel cobalt manganese oxide (NMC, NCM) such as NMC 622, NMC 811, NMC532, NMC111, etc.; lithium iron phosphate (LFP); lithium manganese iron phosphate (LMFP); lithium nickel manganese spinel (LNMO); lithium nickel cobalt aluminium oxide (NCA); lithium manganese oxide (LMO); lithium cobalt oxide (LCO); lithium titanate (LTO); lithium transition metal borates such as borophosphates (BPO), borosilicates (BSiO), borosulfates (BSO), etc.; lithium vanadium phosphate (LVP); etc.) or blend of lithium-containing active materials (e.g., mixtures of the aforementioned materials). However, the cathode active material can additionally or alternatively include sodium-containing active material (e.g., sodium ion battery), potassium-containing cathode active material (e.g., potassium ion battery), magnesium-containing cathode active material (e.g., magnesium ion battery), calcium-containing cathode active material (e.g., calcium ion battery), zinc-containing cathode active material (e.g., zinc ion battery), aluminum-containing cathode active material (e.g., aluminum ion battery), and/or any suitable cathode active material can be used. The cathode active material is typically particulate (e.g., nanoparticle, mesoparticles, macroparticle, etc.), but can form thin films and/or any morphology. Examples of binders include: polyvinylidene fluoride (PVDF), styrene butadiene copolymer (SBR), carboxymethyl cellulose (CMC), polyacrylic acid (PAA), poly(vinyl alcohol) (PVA), humics, poly(3,4-ethylenedioxythio-phene)-polystyrenesulfonate (PEDOT:PSS), chitosan, alginate, polyamide-imide (PAI), combinations or blends thereof, and or other suitable binder(s). Examples of conductive additives include: carbon black, carbon nanotubes, graphite, graphene, fullerenes, carbon fiber (VGCF), Super P Li, Super C65, Super C45, S-O, KS-6, KS-15, SFG-6, SFG-15, 350G, acetylene black, Kezin black, and/or any suitable conductive additive or combination of conductive additives can be used.

The anode (e.g., material thereof) functions to undergo oxidation during battery discharge (e.g., electrons leave the anode during discharge and enter the anode during charging). The anode can include binders (e.g., to bind the anode active material together, to bind the anode active material to the current collector, etc. analogous to a binder as described above for a cathode), anode active material (e.g., the material that participates electrochemically), conductive material (e.g., to increase an electrical conductivity within the anode active material, to improve shuttling of electrons between the current collector and the anode active material, etc. analogous to a conductive additive as described above for a cathode), and/or can include any suitable material(s). The anode active material can be carbon based (e.g., graphite, graphitic carbon, carbon fibers, carbon nanotubes, carbon spheres, carbon nanorods, etc.), alloy materials (e.g., aluminium, tin, magnesium, silver, antimony, their alloys, etc.) conversion-type materials (CTAM such as transition-metal sulfides, oxides, hydroxides, phosphides, nitrides, carbides, fluorides, selenides, chalcogenides, oxalates, niobates, etc.), silicon materials, combinations thereof (e.g., mixtures of graphite and silicon), lithium metal, and/or any suitable anode active material. The anode active material is typically particulate (e.g., nanoparticle, mesoparticles, macroparticle, etc.), but can form thin films and/or any morphology. The anode binder(s) and/or conductive additive(s) can be the same as and/or different from the cathode binder(s) and/or conductive additive(s). In some variants, the battery does not include an anode.

The separator functions to electrically isolate the anode from the cathode (e.g., prevent electrical short circuiting) while allowing ions (e.g., $Li^+$) to pass between the cathode and the anode. The separator can also function to improve the safety of the battery (e.g., by closing pores above a threshold temperature thereby shutting off ion transport) and/or can otherwise function. The separator can be porous, fibrous (e.g., a web, sheet, mat, etc. or oriented or random fibers), and/or have any suitable structure. The porosity of the separator is typically between about 30-50%. However, the porosity can be lower than 30% or higher than 50%. The separator can be made of polymers (e.g., polyolefin such as polyethylene, polypropylene, polybutene, polymethylpentene, etc.; poly(tetrafluoroethylene); poly(vinyl chloride); etc.), nonwoven fibers (e.g., cotton, nylon, glass, polyester, etc.), natural substances (e.g., wood, rubber, asbestos, etc.), and/or of any suitable material. In some variants, the separator can include one or more layers. For instance, the separator can be coated (e.g., polymer coated, carbon coated, ceramic coated, etc.), where the coating can function to aid adhesion, mechanical properties, ion transport, and/or other properties of the separator.

The electrolyte functions to transport ions between the cathode and the anode (e.g., through the separator). Additional functionalities can be conferred to the electrolyte based on additives included therein (e.g., solid-electrolyte interface (SEI) formation, flame retardant, flame suppression, overcharge protection, $H_2O$ and/or HF concentration control, etc.). The electrolyte is preferably a gel electrolyte (e.g., a solvent, additives, etc. contained within a polymer matrix). However, the electrolyte can be a solid (e.g., polymeric solid), liquid, and/or can be any suitable state. The polymer matrix is preferably formed from a formulation as described below. However, other polymeric matrices can be formed (e.g., including structural and/or adhesive monomers with a polymerizable functional group appropriate for the target polymerization mechanism).

The electrolyte can include one or more polymer(s), one or more solvent(s) (e.g., ethylene carbonate (EC), diethyl carbonate (DEC), dimethyl carbonate (DMC), ethyl methyl carbonate (EMC), propylene carbonate (PC), vinylene carbonate (VC), dimethoxyethane (DME), diethyl ether, tetrahydrofuran (THF), methyl formate (MF), ethyl formate (EF), methyl propionate (MP), ethyl formate (EF), ethyl acetate (EA), ethyl propionate (EP), propyl formate, propyl acetate (PA), propyl proprionate (PP), etc.), one or more salt(s) (e.g., $LiPF_6$, $LiAsF_6$, $LiClO_4$, $LiBF_4$, $LiCF_3SO_3$, LiFAP, LiFSI, LiDMSI, LiHPSI, LiTFSI, LiBETI, LiBOB, LiDFOB, LiBFMB, $LiB(CN)_4$, LiDCTA, LiTDI, LiPDI, etc.), one or more additive(s) (e.g., fluoroethylene carbonate (FEC), trivinylcyclotriboroxane (tVCBO), VC, LiDFOB, LiBOB, sulfone, ethyl methyl sulfone, tetramethyl sulfone (TMS), prop-1-ene-1,3-sulfone (PES), 1,3-propane sultone (PS), cyclic sulfate, dioxolone, 5-methyl-4-((trifluoromethoxy)methyl)-1,3-dioxol-2-one, phenyl boronic acid glycol ester (PBE), 5-methyl-4-((trimethylsilyloxy)methyl)-1,3-dioxol-2-one, trimethylphosphate (TMP), triethylphosphate (TEP), tributylphosphate (TBP), triphenylphosphate (TPP), tris(2,2,2-trifluoroethyl)phosphate (TFP), methyl P,P-bis(2,2,2-trifluoroethyl)phosphate (BMP), trimethylphosphite (TMPi), tris(2,2,2-trifluoroethyl)phosphite (TTFPi), dimethyl methyl phosphate (DMMP), diethyl ethylphosphate (DEEP), bis(2,2,2-trifluoroethyl) methylphosphate (TFMP), bis(2,2,2-trifluoroethyl) ethylphosphate (TFEP), hexa(methoxy)cyclotriphosphazene (HMOCPN), (ethoxy)pentafluorocyclotriphosphazene (PFPN), (phenoxy)pentafluorocyclotriphosphazene (FPPN), Phoslyte™, etc.), and/or any suitable material(s).

Figure 3A:
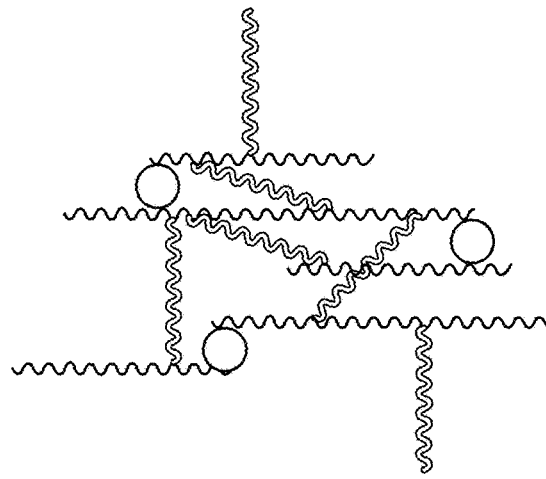
FIG. 3A is a schematic representation of an example of a polymer of a polymer-gel electrolyte with oligomers containing greater than two functional groups.
Figure 3B:
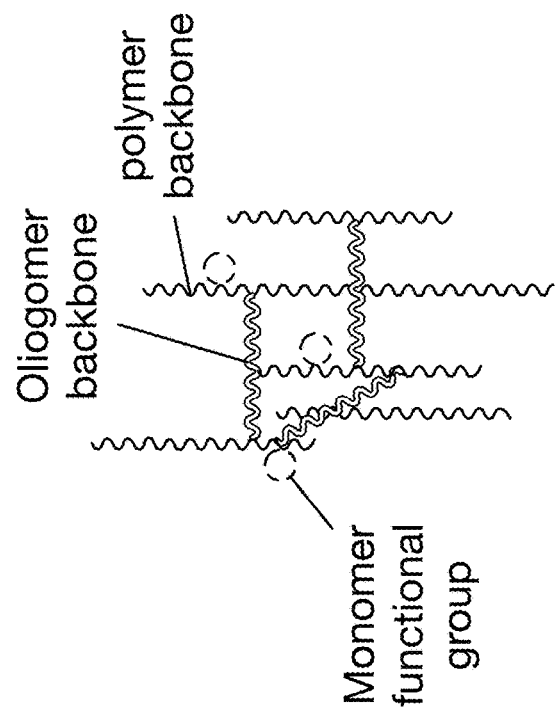
FIG. 3B is a schematic representation of an example of a polymer of a polymer-gel electrolyte formed including a polyfunctional monomer.

In a specific example, the polymer can include one or more hydrocarbon backbone (e.g., formed from polymerization of vinyl groups) with oligomer moieties and/or monomer moieties forming pendant groups or side groups (e.g., in the example as shown in FIGS. 3A-3B, the oligomer backbone shown in grey can be considered a pendant or side group of the polymer backbone shown in black that results from polymerization between vinyl groups of the oligomer and/or monomer, the structural functional groups shown as circles can be considered a pendant or side group of the polymer backbone shown in black that results from polymerization between vinyl groups of the oligomer and/or monomer, etc.). The oligomers and/or monomers can connect to a single polymer backbone at a single location, can connect to a single polymer backbone at a plurality of locations, can connect to multiple polymer backbones (e.g., each end of the oligomer can be integrated into a different polymer backbone within the crosslinked network), and/or can otherwise be connected to any suitable backbone region. The polymer can additionally or alternatively for a linear, block, branched, and/or polymer with any suitable structure.

The polymer electrolyte (e.g., cured polymer electrolyte) preferably has a storage modulus greater than 10 Pa and less than 30000 Pa (e.g., at 1 Hz frequency at a strain within the linear viscoelastic range of the gel polymer electrolyte). Outside this range, the polymer electrolyte can result in more brittle battery cells.

The battery preferably includes at most 2.5 g of polymer electrolyte per Amp hr of capacity. However, greater amounts of polymer electrolyte can be used.

As an illustrative example, an electrolyte can include a polymer (e.g., formed by polymerizing, treating, curing, etc. a formulation as described below; ladder polymer; crosslinked polymer network with a structure like that shown schematically in FIGS. 3A-3B; etc.), approximately 1M $LiPF_6$ dissolved in an approximately 1:1:1 (e.g., v/v, w/w, v/w, w/v, etc.) mixture of EC:EMC:PC, 1-5% FEC, 1-5% VC, 0-5% 1,3-propanesultone, and 5% TMP (where the percentages can refer to mass percent, volume percent, stoichiometric percent, etc.). In a variation of this illustrative example, the solvent can be an approximately 3:7 mixture of EC and EMC. In a second variation of this specific example, the solvent can include an approximately 1:1 mixture of EC and DEC. However, any suitable electrolyte can be used.

The electrolyte is typically at most about 45% polymer (e.g., weight percent, volume percent, stoichiometric percent, etc.), with the remainder being one or more plasticizers (e.g., solvent(s), salt(s), additive(s)). However, in some variants, the electrolyte can be solventless (e.g., majority polymer with additives, salts, etc. in the polymer), i.e., up to 90% polymer (with the remaining 10% including salt, additives, etc.). As a specific example, an electrolyte (before curing, treating, polymerization, etc.) can include about 10-20 wt % polymer precursor (e.g., oligomer, monomer, etc.) and about 80-90 wt % other electrolyte components (e.g., solvent, salt, additives, etc.). In a second specific example, an electrolyte (before curing, treating, polymerization, etc.) can include about 30-40 wt % oligomer, 30-40 wt % monomer, and 20-40 wt % other electrolyte components (e.g., solvent, salt, additives, etc.).

4. Polymer Electrolyte Formulation

The polymer electrolyte formulation (also referred to as the polymer precursor, prepolymerized solution, etc.) can include one or more oligomers, one or more monomers (e.g., structural monomers, adhesive monomers, stiffening monomers, compliant monomers, monomer additives, etc.), one or more radical inhibitors, one or more radical initiators (typically added immediately before the polymer electrolyte formulation will be cured or treated to form the polymer), one or more additive, solvent (e.g., as described above), additives (e.g., as described above), salts (e.g., as described above), and/or any suitable components.

The oligomers (e.g., polymer precursor oligomers; oligomers that can undergo further polymerization reactions to form a polymer, gel, etc.; etc.) preferably function to form a polymer matrix that enables ionic transport throughout the polymer. In some variants, the oligomers can be difunctional oligomers (e.g., feature polymerizable groups on two sites such as two accessible vinyl groups, as shown for example in FIG. 4) which can facilitate and/or enable the formation of a crosslinked polymer network (upon polymerization). In other variants, the oligomers can be trifunctional oligomers (e.g., feature polymerizable groups on three sites such as three accessible vinyl groups), tetrafunctional oligomers (e.g., feature polymerizable groups on four sites such as four accessible vinyl groups), hexafunctional oligomers (e.g., feature polymerizable groups on six sites such as six accessible vinyl groups), and/or can have any suitable number of accessible polymerizable group(s).

The oligomer is typically a co-oligomer (e.g., made from two or more monomers) but could be a homooligomer. The co-oligomer can be an alternative co-oligomer (e.g., A-B-A-B-A-B for monomers A and B), random co-oligomer, block co-oligomer (e.g., A-A-A-A-B-B-B-B for monomers A and B), graft co-oligomer, and/or can have any suitable structure.

The oligomers preferably have non-polar backbone (e.g., hydrocarbon, aliphatic, aromatic, etc. such as diethylene, triethylene, hexaethylene, etc.) linked by polar groups (e.g., ester, carbonate, urethane, ether, siloxane, imide, etc.).

The oligomer is preferably terminated with an acrylate or methacrylate group (to facilitate polymer formation). However, the oligomer can additionally or alternatively be terminated with any suitable end group. In a preferred variant, the oligomer can include a urethane (e.g., a diurethane) between the acrylate and the rest of the oligomer. However, the oligomer can include any suitable structure. For example, a urethane acrylate (e.g., a monofunctional aliphatic hydrophobic urethane acrylate, difunctional aliphatic hydrophobic urethane acrylate, trifunctional aliphatic hydrophobic urethane acrylate, tetrafunctional aliphatic hydrophobic urethane acrylate, hexafunctional aliphatic hydrophobic urethane acrylate, aromatic hydrophobic urethane acrylate, etc.) can be used as the oligomer.

Figure 4:
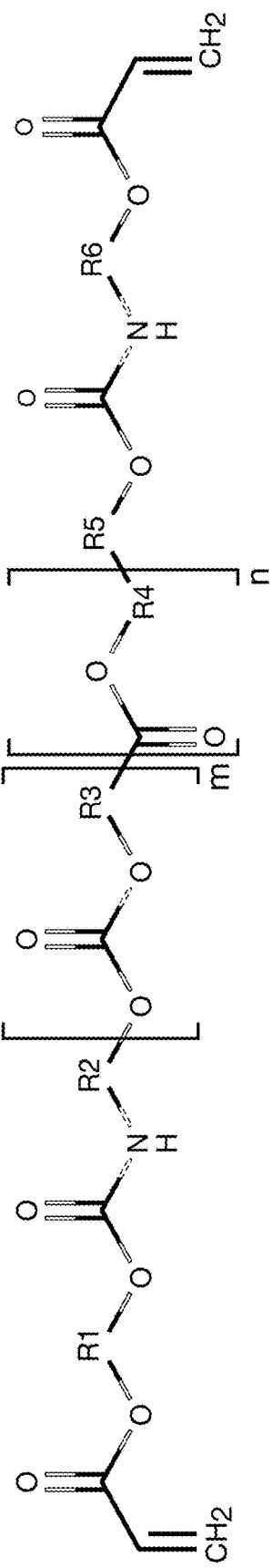
FIG. 4 is a schematic representation of an example oligomer (e.g., prior to polymerization).

As shown in an illustrative example in FIG. 4, the oligomer can be capped with a urethane acrylate group (e.g., an acrylate end group separated from a urethane with an alkyl, haloalkyl, cycloalkyl etc. with a carbon chain length or ring size between 1 and 40 carbons long, etc.; separated from a diurethane with an alkyl, haloalkyl, cycloalkyl, etc. with a carbon chain length between 1 and 40 carbons long where the two urethanes can be separated by a linear carbon chain, a branching carbon chain, a cycloalkyl, etc.; an acrylate separated from a diurethane derived from isophorone diisocyanate by an alkyl, haloalkyl, cycloalkyl, etc. hydrocarbon with chain length between 1 and 40 carbons long; an acrylate separated from a diurethane derived from 4,4-methylenebis(cyclohexyl isocyanate) by an alkyl, haloalkyl, cycloalkyl, etc. hydrocarbon with chain length between 1 and 40 carbons long; an acrylate separated from a diurethane derived from tolune-2,4-diisocyanate by an alkyl, haloalkyl, cycloalkyl, etc. hydrocarbon with chain length between 1 and 40 carbons long; an acrylate separated from a diurethane derived from hexamethylene diisocyanate by an alkyl, haloalkyl, cycloalkyl, etc. hydrocarbon with chain length between 1 and 40 carbons long; an acrylate separated from a diurethane derived from tetramethylxylylene diisocyanate by an alkyl, haloalkyl, cycloalkyl, etc. hydrocarbon with chain length between 1 and 40 carbons long; an acrylate separated from a urethane derived from 1,3,5-Tris(6-isocyanatohexyl)biuret by an alkyl, haloalkyl, cycloalkyl, etc. hydrocarbon with chain length between 1 and 40 carbons long; etc.). In this illustrative example, the R1, R3, R4, and R5 groups can be the same or different and can be straight chain or branching alkyl (e.g., with a chain length between 0 and 20 carbons and branch lengths between 1 and 40 carbons long), straight chain or branching haloalkyl (e.g., with a chain length between 1 and 40 carbons and branch lengths between 1 and 40 carbons long, with fluoro, chloro, bromo, iodo, or combinations thereof), cycloalkyl, benzyl, include polar groups (e.g., ester, carbonate, urethane, ether, siloxane, imide, etc.), and/or can have other suitable structures. In some variations of this illustrative example, the R3 or R4 groups in particular but not exclusively can additionally or alternatively include heteroatoms such as carboxyl, imido, amino, carboxylate, ester, ether, amino, or other structures (where the heteroatoms are preferably not bonded to hydrogen). In this illustrative example, the R2 and R6 groups can be the same or different and can include cycloalkyl (e.g., cyclohexane, cyclopentane, etc.), straight chain or branching alkyl (e.g., with a chain length between 1 and 40 carbons and branch lengths between 1 and 40 carbons long), straight chain or branching haloalkyl (e.g., with a chain length between 1 and 40 carbons and branch lengths between 1 and 40 carbons long, with fluoro, chloro, bromo, iodo, or combinations thereof), benzyl, urethane (e.g., a urethane derived from isophorone diisocyanate (IPDI) where one urethane group is shown outside of the R2 or R6, a urethane derived from 4,4-methylenebis(cyclohexyl isocyanate) where one urethane group is shown outside of the R2 or R6, a urethane derived from methylene diphenyl diisocyanate (MDI) where one urethane group is shown outside of the R2 or R6, a urethane derived from tolune-2,4-diisocyanate (TDI) where one urethane group is shown outside of the R2 or R6, a urethane derived from hexamethylene diisocyanate (HDI) where one urethane group is shown outside of the R2 or R6, a urethane derived from 2,2-bis[[4-(isocyanatomethyl)phenyl]methyl] butyl N-[[4-(isocyanatomethyl)phenyl]methyl]carbamate where one urethane group is shown outside of the R2 or R6, etc., a urethane derived from 4arm-PEG-isocyanate where one urethane group is shown outside of the R2 or R6, a urethane derived from 1,3,5-tris(6-isocyanatohexyl)-1,3,5-triazin-2,4,6-trione where one urethane group is shown outside of the R2 or R6, a urethane derived from 1,3,5-tris (6-isocyanatohexyl)-biuret where one urethane group is shown outside of the R2 or R6, a urethane derived from trimers of any or more of HDI, TDI, IPDI, MDI, etc. where one urethane group is shown outside of the R2 or R6, a urethane derived from dimers formed from trimers of any or more of HDI, TDI, IPDI, MDI, etc. where one urethane group is shown outside of the R2 or R6, etc.), and/or other suitable structure(s).

In some variants, the composition can include a mixture of oligomers. For instance, the composition can include a first oligomer and a second oligomer that are different from each other and each selected from the group of materials comprising: polycarbonate urethane acrylate, polyether urethane acrylate, polyester urethane acrylate, polycarbonate polyether urethane acrylate, polycarbonate polyester urethane acrylate, polyether polyester urethane acrylate, polycarbonate polyether polyester urethane acrylate, polyurethane acrylate, polycarbonate polyurethane acrylate, polyether polyurethane acrylate, polyester polyurethane acrylate, polycarbonate polyether polyurethane acrylate, polycarbonate polyester polyurethane acrylate, polyether polyester urethane acrylate, polycarbonate polyether polyester urethane acrylate, polycarbonate urethane methacrylate, polyether urethane methacrylate, polyester urethane methacrylate, polycarbonate polyether urethane methacrylate, polycarbonate polyester urethane methacrylate, polyether polyester urethane methacrylate, polycarbonate polyether polyester urethane methacrylate, polyurethane methacrylate, polycarbonate polyurethane methacrylate, polyether polyurethane methacrylate, polyester polyurethane methacrylate, polycarbonate polyether polyurethane methacrylate, polycarbonate polyester polyurethane methacrylate, polyether polyester urethane methacrylate, polycarbonate polyether polyester urethane methacrylate. As an illustrative example, one of the oligomers can be used as an additive (e.g., to act as an adhesion promoter, to modify rheology of the precured electrolyte, to modify mechanical properties of the cured electrolyte, to modify ionic or electronic transport properties of the cured electrolyte, etc.) while the other oligomer can act as the primary electrolyte (e.g., contributing to a majority of the properties of the electrolyte (precured and/or post-during properties). For instance, the oligomer portion of the polymer electrolyte composition could include about 1-20% (by mass, by volume, by stoichiometery, etc.) of the first oligomer and about 80-99% (by mass, by volume, by stoichiometry, etc.) of the second oligomer.

In some variants, the oligomer can further include one or more binder within the oligomer. For instance, the oligomer can have a structure such as

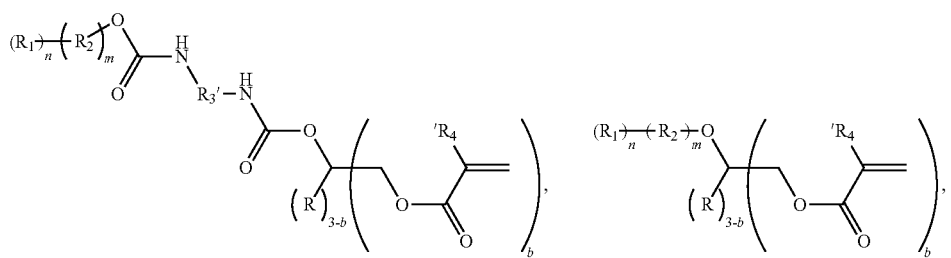
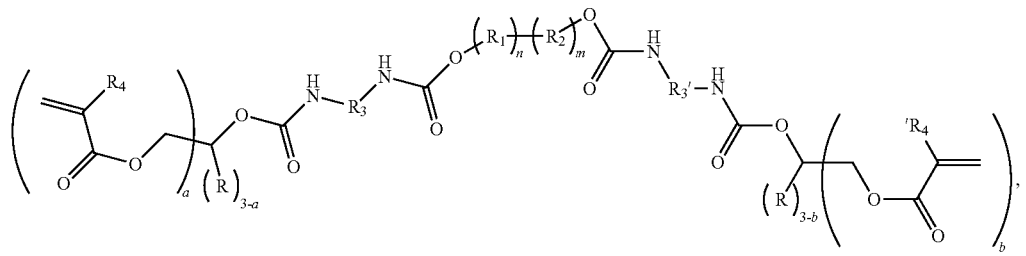
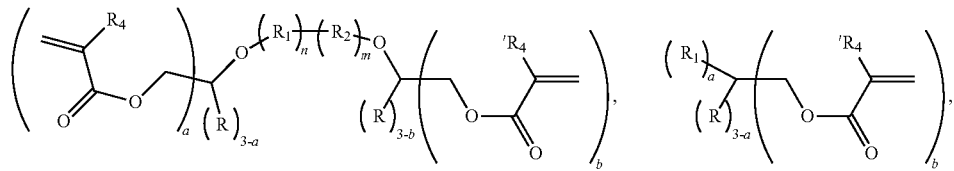
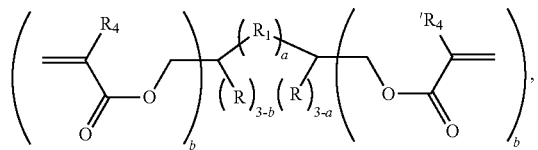
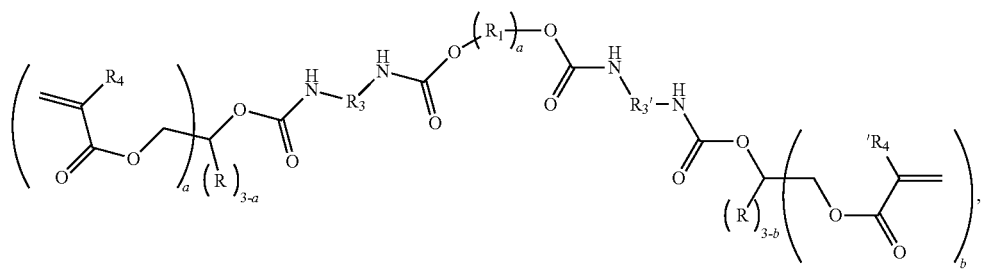
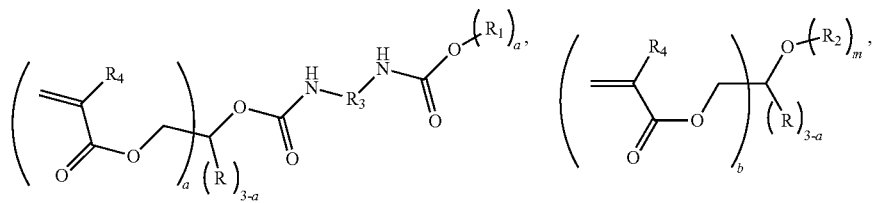
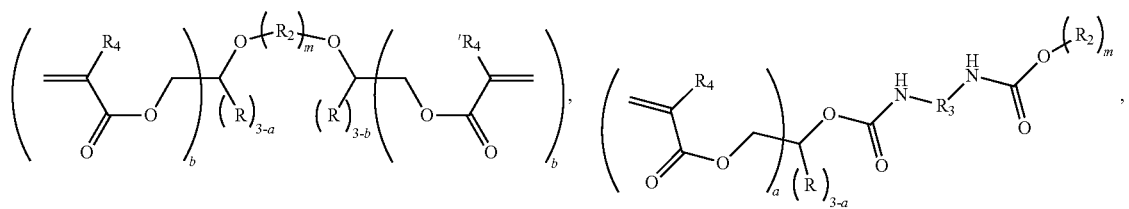

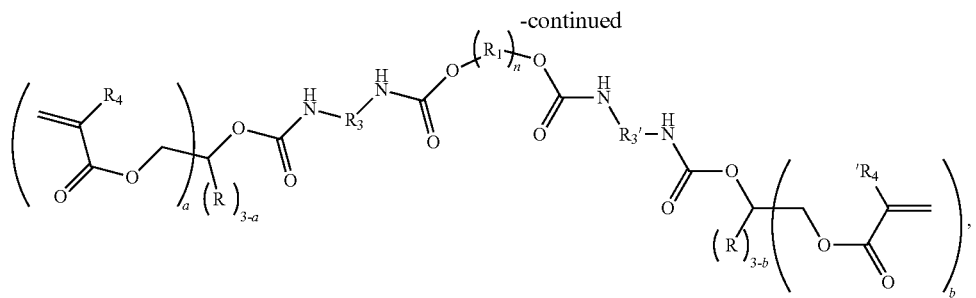
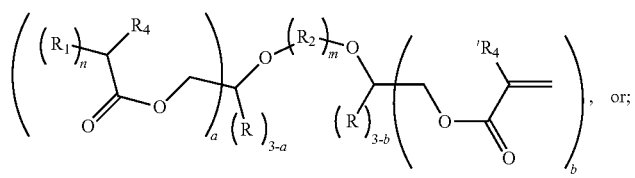, or;
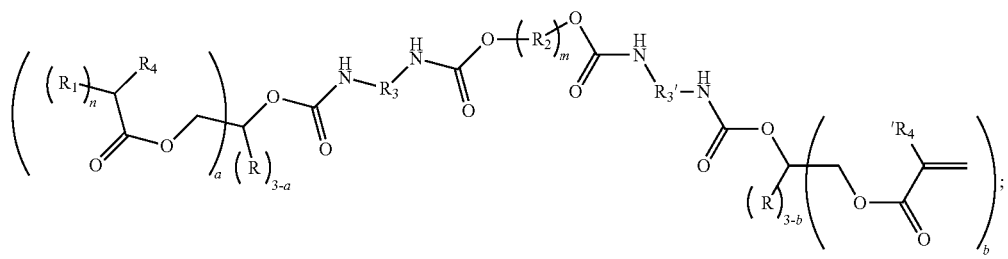
where each $R_1$ is selected from the group consisting of: carboxymethylcellulose (CMC e.g.,
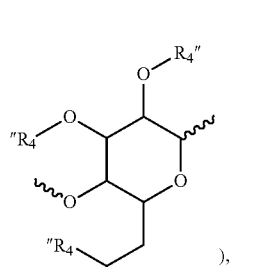),
polyacrylic acid (PAA e.g.,
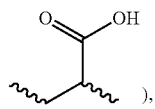),
polyvinyl alcohol (PVA e.g.,
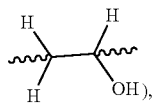),
polyvinylidene fluoride (PVDF e.g.,
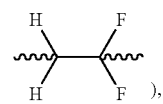),
styrene-butadiene rubber (SBR e.g.,
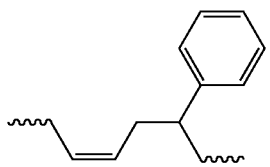
or other related structures with different bonding motifs derived from 1,3-butadiene and styrene), polyamide-imide (PAI
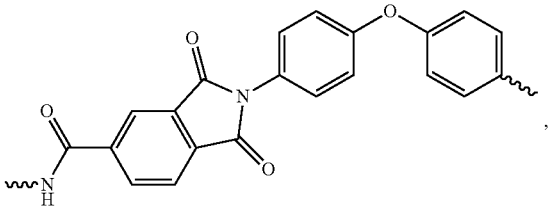,

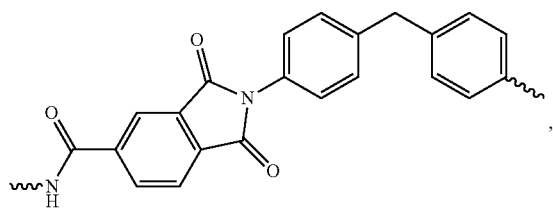

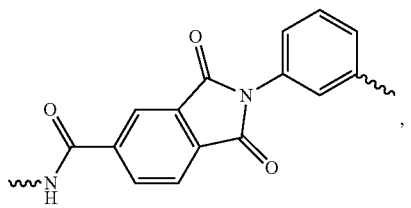

or other such structures including an amide and imide functional groups), and combinations or derivatives thereof; where each R₂ monomer is selected from the group consisting of:

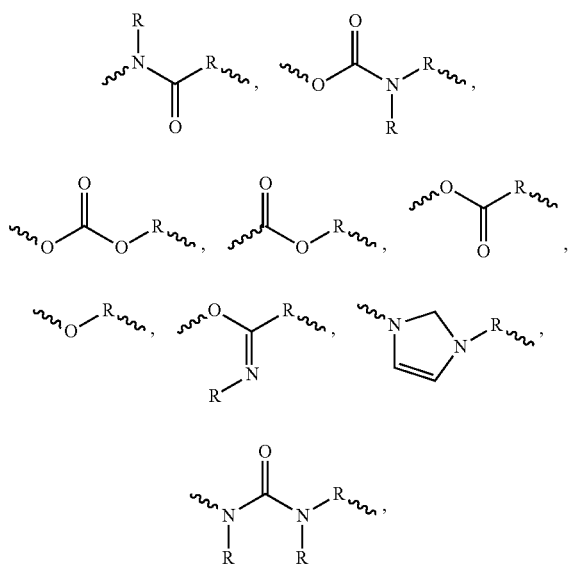

or combinations thereof; where R3 and R3' are each independently selected from the group consisting of:

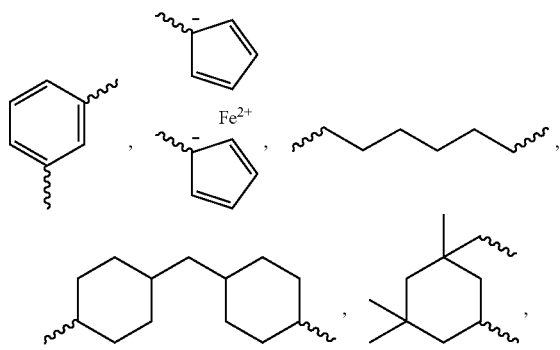

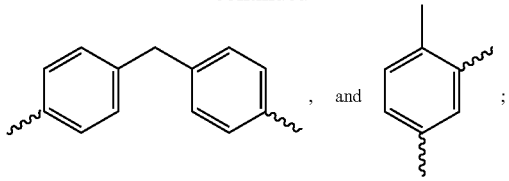

where R4 and R4' are each independently selected from the group consisting of hydrogen, methyl, and ethyl; where each R is independently selected from the group consisting of: a substituted or unsubstituted alkylene group having 1 to 40 carbon atoms, a substituted or unsubstituted cycloalkylene group having 4 to 40 carbon atoms, and a substituted or unsubstituted arylene group having 6 to 40 carbon atoms; wherein n and m are the number of repeat or individual monomer units, where n and m are each independently a value between 1 and 1000; and wherein a and b are each independently between 0 and 3, wherein at least one of a or b is not 0. Note that n=0 can be analogous to the specific example as shown for instance in FIG. 4.

The monomers (e.g., polymer precursor monomers) preferably function to modify (e.g., increase, decrease, change an isotropicity of, etc.) structural properties of a battery cell. Examples of structural properties include: flexural modulus, flexural strength, stiffness, bending stiffness, compliance, elastic modulus, hardness, mechanical impedance, Young's modulus, elasticity, plasticity, structural stability, tensile strength, toughness, creep compliance, and/or other mechanical properties of the battery (e.g., act as structural monomers such as stiffening monomers, compliant monomers, etc.). The monomers can additionally, or alternatively, function to modify an adhesive to change (e.g., reduce) the viscosity of the polymer precursor and/or otherwise function. Note that a monomer can perform more than one function (e.g., can be both a stiffening monomer and adhesion monomer, be both a stiffening monomer and a cross-linking monomer, etc.). The monomers can be monofunctional, difunctional, trifunctional, tetrafunctional, pentafunctional, hexafunctional, and/or have a greater number of functional groups (e.g., sites where polymerization with other monomers and/or oligomers can occur). Tuning the number of functional groups of the monomer (in combination with a relative concentration of the monomer to oligomer) can be used to tune a crosslinking density of the polymer electrolyte.

Stiffening monomers are typically chosen (e.g., identified) based on a glass transition temperature for homopolymers derived from the monomers. However, stiffening monomers can additionally or alternatively be chosen based on any suitable property(s) of the monomers (e.g., viscosity, wettability, etc.). In a preferred example, the glass transition temperature of the homopolymer derived from the stiffening monomer is at least about 40° C. (e.g., greater than room temperature such as ≥45° C., ≥50° C., ≥55° C., ≥60° C., ≥70° C., ≥75° C., ≥80° C., ≥85° C., ≥90° C., ≥95° C., ≥100° C., ≥110° C., ≥120° C., ≥150° C., etc.). However, the stiffening monomers can otherwise be chosen and/or identified. Examples of stiffening monomers include: acrylates (e.g., isobornyl acrylate hexadecyl acrylate, t-butyl acrylate

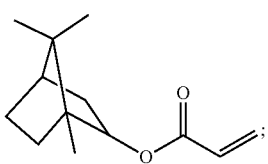

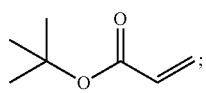

silsesquioxane acrylates such as with T6 cage structure, T8 cage structure, T10 cage structure, T12 cage structure,

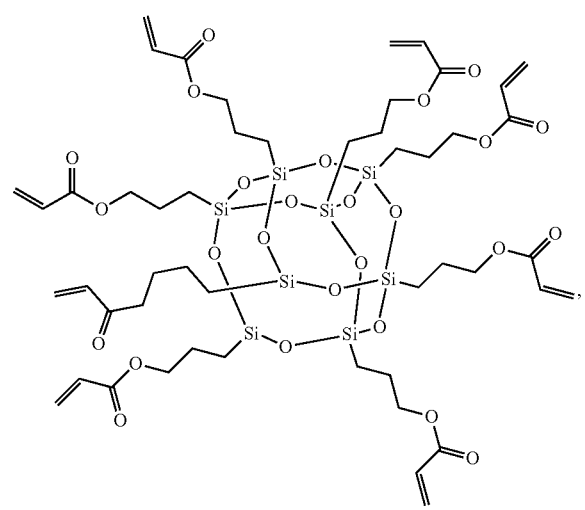

POSS acrylate, etc.; inorganic particles with a characteristic size between 10 nm and 20 μm with terminal acrylates such as silica particles, alumina particles, titania, etc.; etc.), methacrylates (e.g., methacrylic acid

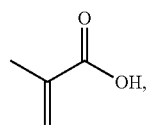

methyl methacrylate

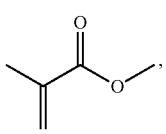

benzyl methacrylate, ethyl methacrylate, isopropyl methacrylate, hydropropyl methacrylate

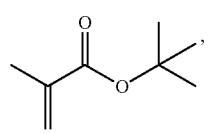

isobutyl methacrylate, t-butyl methacrylate

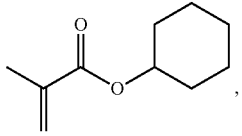

cyclohexyl methacrylate

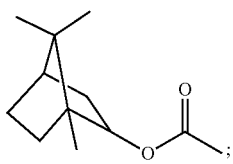

isobornyl methacrylate

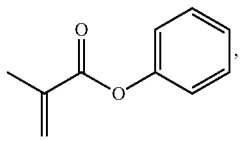

phenyl methacrylate

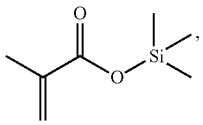

trimethylsilyl methacrylate

T6 silsesquioxane methacrylate, T8 silsesquioxane methacrylate, T10 silsesquioxane methacrylate, T12 silsesquioxane methacrylate, POSS methacrylate, inorganic particles with a characteristic size between 10 nm and 20 μm with terminal methacrylates, silica particles with a characteristic size between 10 nm and 20 µm with terminal methacrylates, alumina particles with a characteristic size between 10 nm and 20 µm with terminal methacrylates, titania particles with a characteristic size between 10 nm and 20 µm with terminal methacrylates, etc.), cyanoacrylates (e.g., methyl cyanoacrylate

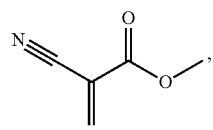

ethyl cyanoacrylate

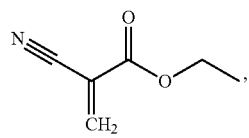

propyl cyanoacrylate

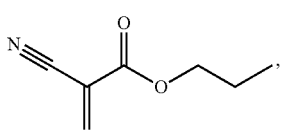

isopropyl cyanoacrylate

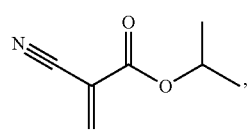

butyl cyanoacrylate

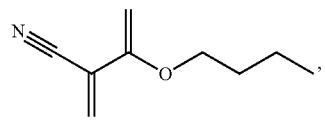

allyl cyanoacrylate

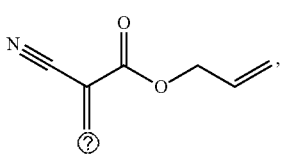

methoxyethyl cyanoacrylate

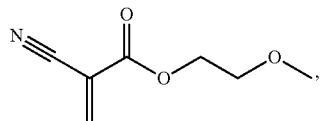

T6 silsesquioxane cyanoacrylate, T8 silsesquioxane cyanoacrylate, T10 silsesquioxane cyanoacrylate, T12 silsesquioxane cyanoacrylate, POSS cyanoacrylate, inorganic particles with a characteristic size between 10 nm and 20 µm with terminal cyanoacrylates, silica particles with a characteristic size between 10 nm and 20 µm with terminal cyanoacrylates, alumina particles with a characteristic size between 10 nm and 20 µm with terminal cyanoacrylates, titania particles with a characteristic size between 10 nm and 20 µm with terminal cyanoacrylates etc.), acrylamides (e.g., acrylamide

N,N dimethyl acrylamide

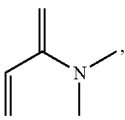

t-butyl acrylamide

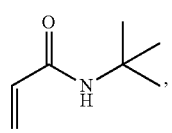

etc.), styrenes (e.g., styrene

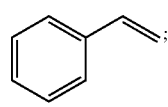

methylstyrene such as

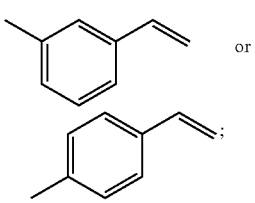

or dimethylstyrene such as

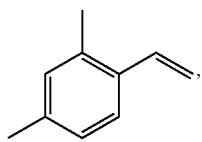, or

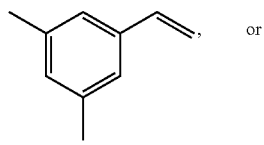;

trimethylstyrene such as

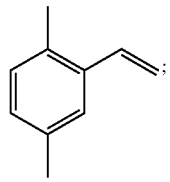;

t-butyl styrene such as

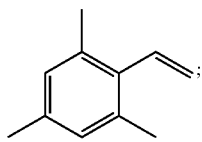, halostyrenes such as

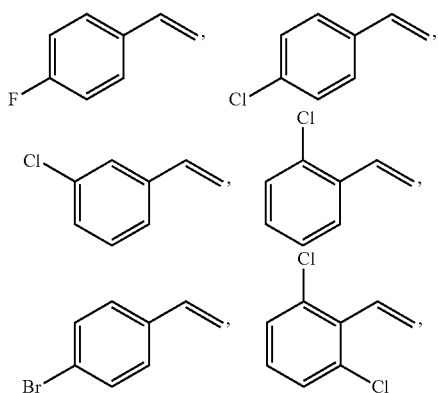

etc.; ethoxystyrene such as

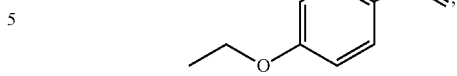;

acetoxystyrene such as

;

etc.), acrylonitrile (e.g., methacrylonitrile

, and/or other suitable stiffening monomers (particularly, but not exclusively, monomers that include at least one accessible vinyl group for polymerization).

Compliant monomers are typically chosen (e.g., identified) based on a glass transition temperature for homopolymers derived from the monomers. In a preferred example, the glass transition temperature of the homopolymer derived from the compliant monomer is less than about 40° C. (e.g., <35° C., <30° C., <25° C., <10° C., <0° C., etc.). However, the compliant monomers can otherwise be chosen and/or identified. Examples of compliant monomers include: acrylates (e.g., methyl acrylate, benzyl acrylate, dodecyl acrylate, 2-ethoxyethyl acrylate, ethyl acrylate, butyl acrylate, sec-butyl acrylate, 2-ethylhexyl acrylate, hexyl acrylate, 2-cyanoethyl acrylate, cyclohexyl acrylate, isobutyl acrylate, isopropyl acrylate, 2-methoxyethyl acrylate, methyl acrylate, 2,2,2-trifluoroethyl acrylate, etc.), methacrylates (e.g., dimethylaminoethyl methacrylate, dodecyl methacrylate, 2-tert-butylaminoethyl methacrylate, n-butyl methacrylate, 2-ethylhexyl methacrylate, hexadecyl methacrylate, hexyl methacrylate, 2-hydropropyl methacrylate, 2-hydroxyethyl methacrylate, diethylaminoethyl methacrylate, octadecyl methacrylate, octyl methacrylate, etc.), cyanoacrylates (e.g., 2-octyl cyanoacrylate, n-decyl cyanoacrylate, etc.), styrenes (e.g., 2-methylstyrene), and/or other suitable compliant monomers (particularly, but not exclusively, monomers that include at least one accessible vinyl group for polymerization).

Examples of crosslinking monomers can include: diacrylates (e.g., polycaprolactone diacrylate, 1,4-butanediol diacrylate, poly(ethylene glycol) diacrylate such as with a Mw between 100 and 50000 Da, bisphenol A ethoxylate diacrylate, di(ethylene glycol) diacrylate, ethylene glycol diacrylate, 1,6-hexanediol diacrylate, poly(propylene glycol) diacrylate such as with a Mw between 100 and 50000 Da, 1,3-butanediol diacrylate, glycerol 1,3-diglycerolate diacrylate, tetra(ethylene glycol) diacrylate, neopentyl glycol diacrylate, tritolylamine diacrylate, tri(ethylene glycol) diacrylate, PEG-PPG diacrylate such as with a Mw between 100 and 50000 Da, PEG-PPG-PEG diacrylate such as with a Mw between 100 and 50000 Da, tricyclo[5.2.1.0$^{2,6}$]decanedimethanol diacrylate, fluorescein O,O'-diacrylate, bisphenol A glycerolate diacrylate, PCL-PEG-PCL diacrylate such as with a Mw between 100 and 50000 Da, tri(propylene glycol) diacrylate, trimethlolpropane ethoxylate methyl ether diacrylate, 9-(acryloyloxy)nonyl acrylate, bis[2-(acryloyloxy) ethyl]phosphate etc.), dimethacrylates (e.g., polycaprolactone dimethacrylate, 1,4-butanediol dimethacrylate, poly (ethylene glycol) dimethacrylate such as with a Mw between 100 and 50000 Da, bisphenol A ethoxylate dimethacrylate, di(ethylene glycol) dimethacrylate, ethylene glycol dimethacrylate, 1,6-hexanediol dimethacrylate, poly(propylene glycol) dimethacrylate such as with a Mw between 100 and 50000 Da, 1,3-butanediol dimethacrylate, glycerol 1,3-diglycerolate dimethacrylate, tetra(ethylene glycol) dimethacrylate, neopentyl glycol dimethacrylate, tritolylamine dimethacrylate, tri(ethylene glycol) dimethacrylate, PEG-PPG dimethacrylate such as with a Mw between 100 and 50000 Da, PEG-PPG-PEG dimethacrylate such as with a Mw between 100 and 50000 Da, tricyclo[5.2.1.0$^{2,6}$]decanedimethanol dimethacrylate, fluorescein O,O'-dimethacrylate, bisphenol A glycerolate dimethacrylate, PCL-PEG-PCL dimethacrylate such as with a Mw between 100 and 50000 Da, tri(propylene glycol) dimethacrylate, trimethlolpropane ethoxylate methyl ether dimethacrylate, 9-(acryloyloxy)nonyl dimethacrylate, Bis[2-(methacryloyloxy)ethyl] phosphate, etc.), triacrylates (e.g., trimethylolpropane ethoxylate triacrylate, trimethylolpropane triacrylate, trimethylolpropane propoxylate triacrylate, glycerol propoxylate triacrylate, pentaerythritol triacrylate, zirconium bromonorbornanelactone carboxylate triacrylate, tris[2-(acryloyloxy) ethyl]isocyanurate, tris[2-(acryloyloxy)ethyl]phosphate, etc.), trimethacrylates (e.g., trimethylolpropane ethoxylate trimethacrylate, trimethylolpropane trimethacrylate, trimethylolpropane propoxylate trimethacrylate, glycerol propoxylate trimethacrylate, pentaerythritol trimethacrylate, zirconium bromonorbornanelactone carboxylate trimethacrylate, tris[2-(methacryloyloxy)ethyl]isocyanurate, tris[2-(methacryloyloxy)ethyl]phosphate, etc.), tetraacrylates (e.g., pentaerythritol tetraacrylate, 3-(N,N,N,N tetrakis(propionate) hexanediamino)-2-hydroxypropyl acrylate, etc.), tetramethacrylates (e.g., pentaerythritol tetramethacrylate, 3-(N,N,N,N tetrakis(propionate) hexanediamino)-2-hydroxypropyl methacrylate, etc.), pentaacrylate (e.g., dipentaerythritol pentaacrylate), pentamethacrylate (e.g., dipentaerythritol pentaacrylate), hexaacrylates (e.g., dipentaerythritol hexaacrylate), hexamethacrylates (e.g., dipentaerythritol hexamethacrylate), silsesquioxane acrylates, polyhedral oligomeric silsesquioxane (POSS) acrylates, silsesquioxane methacrylates, POSS methacrylates, and/or other suitable monomers (e.g., monomers that include more than one accessible vinyl group for polymerization).

In preferred variants, an average functionalization (e.g., on a per mole basis relative to combined number of moles in oligomers and monomers) is between about 1.5 and 2.1. As a first illustrative example, a composition that includes only difunctional oligomers would have an average functionalization of 2. As a second illustrative example, a composition the includes 50% by moles monofunctional oligomers (e.g., monoacrylates or monomethacrylates) and 50% by moles trifunctional monomers (e.g., triacrylates or trimethacrylates) would similarly have an average functionalization of 2. As a third illustrative example, a composition that includes 80% by moles of monofunctional oligomers (e.g., monoacrylates or monomethacrylates) and 20% by moles of hexafunctional oligomers (e.g., hexaacylates, hexamethacrylates) would have an average functionalization of 2. Other mixtures can achieve similar resulting average functionalization. The inventors have found that while improved mechanical properties in the cured polymer can result from higher average functionalization, the battery cell can result in greater battery cell brittleness. However, in some variations (e.g., when the oligomer includes binder moieties) higher average functionalization can be used.

Adhesion monomers typically include one or more heteroatom functional groups such as hydroxyl, thiols, selenols, carboxylates, carbonate, carbothioic acid, dithiocarboxylic acid, sulfonate, isothiocyanate, phosphate, silanol, siloxide, siloxane, silyl ether, and/or other suitable functional groups. Examples of adhesion monomers can include: acrylates (e.g., hydroxyethyl acrylate, hydroxypropyl acrylate, etc.), methacrylates (e.g., hydroxyethyl methacrylate, hydroxypropyl acrylate, etc.), silsesquioxane acrylates, POSS acrylates, silsesquioxane methacrylates, POSS methacrylates, and/or other suitable monomers. In some variants, adhesion can additionally or alternatively be tuned functionalizing a surface (e.g., charge collector, particle, etc.) with vinyl groups. As an illustrative example, alumina (and/or aluminium oxide clusters) and/or silica (and/or silicon, silicon oxide clusters, etc.) can be functionalized with vinyl groups where the vinyl groups can polymerize within the polymer electrolyte and the alumina and/or aluminium oxide clusters can interact with a current collector, cathode material, anode material, and/or separator.

In some variants, the polymer precursor can exclude oligomers (e.g., favoring formation of the polymer using exclusively monomers). These variants may result in less structurally favorable properties (e.g., more brittle polymers) but generally have lower viscosity relative to a formulation using a mixture of oligomers and monomers, which can provide a technical advantage of improving the electrolyte's ability to wet the electrodes (or other battery surfaces).

In variants that include a plurality of oligomers and/or a plurality of monomers, the ratio (e.g., weight ratio, volume ratio, stoichiometric ratio, etc.) of all of the oligomers to all of the monomers is typically between about 1:1000 and 1000:1. In one specific example, the inventors found that more than about 5% (by mass, by moles, etc.) of monomers (particularly stiffening monomers) can result in brittle battery cells (and thus targeted 0.1-5% of monomer within the polymer-forming (or capable of covalently incorporating into the polymer) component of the electrolyte (e.g., the remainder being predominantly oligomers and/or initiator). However, the ratio of all of the oligomers to all of the monomers can be any suitable ratio.

In some variants, a mixture of monomers can be included in the polymer precursor which can be beneficial for tuning the structural properties of the battery cell. For instance, to produce a high stiffness battery cell for a given current collector, electrodes, separator, housing, etc. (e.g., a battery cell with flexural modulus that is at least 10× greater than the flexural modulus for the same battery cell with a liquid electrolyte), the polymer precursor could include only oligomers (e.g., difunctional aliphatic hydrophobic urethane acrylates such as with hydrocarbon chains containing at least 5 carbon atoms linking polar head groups within the backbone) and stiffening monomers; whereas to produce a battery cell with an intermediate stiffness (e.g., a battery cell with flexural modulus that is 10× greater than the flexural modulus for the same battery cell with a liquid electrolyte), the polymer precursor could include oligomers (e.g., difunctional aliphatic hydrophobic urethane acrylates such as with hydrocarbon chains containing at least 5 carbon atoms linking polar head groups within the backbone), stiffening monomers, and compliant monomers.

In other variations, a high stiffness battery cell could be achieved using only stiff oligomer (or a mixture of stiff oligomers); whereas a battery cell with an intermediate stiffness could be achieved by using stiff oligomers (e.g., difunctional aliphatic hydrophobic urethane acrylates) with compliant monomers. In related variations, monomers can be included with the stiff oligomer, which can provide a technical advantage of improving a wettability and/or viscosity of the polymeric precursor for formation of the gel electrolyte within a battery. In these and related variations, the stiffness of the oligomer (and/or resulting polymer from a stiff oligomer) can be tuned, controlled, and/or otherwise modified based on the backbone chain length (e.g., number of carbon atoms between polar groups in the backbone, where typically shorter chains result in stiff oligomers), degree of unsaturation of the oligomer backbone (e.g., presence of, number of, etc. double bonds, triple bonds, rings, aromatic, etc. in the oligomer backbone; where higher degrees of unsaturation or more types of unsaturation typically result in stiff oligomers), intermolecular forces between or within oligomer backbones (e.g., with greater intermolecular forces typically resulting in stiff oligomers, removing polar groups to reduce a stiffness, etc.), lower glass transition temperature ($T_g$) of polymers formed from polymerization of the oligomer or the $T_g$ of the oligomer (e.g., using lower molecular weight oligomer) using ladder-like oligomers, and/or a stiff oligomer can otherwise be achieved.

In another variation, a high stiffness battery cell could be achieved using only oligomers that can achieve high cross-linking densities (e.g., trifunctional aliphatic hydrophobic urethane acrylates, tetrafunctional aliphatic hydrophobic urethane acrylates, hexafunctional aliphatic hydrophobic urethane acrylates, etc.); whereas a battery cell with an intermediate stiffness could be achieved by using high crosslinking density oligomers (e.g., trifunctional aliphatic hydrophobic urethane acrylates, hexafunctional aliphatic hydrophobic urethane acrylates, etc.) with compliant monomers. In a related variation, the battery cell with the intermediate stiffness could be achieved by using a lower crosslinking density oligomer (e.g., a combination of high crosslinking density oligomers and lower crosslinking density oligomers such as a difunctional aliphatic hydrophobic urethane acrylates) optionally with one or more stiff or compliant monomer.

In another variation, a high stiffness battery cell could be achieved using an oligomer (e.g., a difunctional aliphatic hydrophobic urethane acrylate) and a structural monomer that can achieve high crosslinking densities (e.g., trifunctional monomer, tetrafunctional monomer, hexafunctional monomer, etc.); whereas a battery cell with an intermediate stiffness could be achieved by using an oligomer (e.g., a difunctional aliphatic hydrophobic urethane acrylate) and a structural monomer that can achieve a relatively lower crosslinking densities (e.g., difunctional monomer, trifunctional monomer, tetrafunctional monomer, etc.). Additionally or alternatively, the intermediate stiffness battery cell could be achieved using a high cross linking density monomer and a compliant monomer and/or a stiffening monomer.

These examples and variations are non-limiting examples of combinations of oligomers and monomers that could be combined to form high and lower stiffness battery cells for a given oligomer. Other variations exist such as tuning a relative ratio of oligomer concentration to monomer concentration, tuning a relative monomer concentration (e.g., between a stiffening monomer and a compliant monomer, between a plurality of stiffening monomers, etc.), tuning a cross-linking density (or functionalization of the oligomers) of the resulting polymer electrolyte (e.g., based on curing parameters such as time, temperature, pressure, polymerization initiator, polymerization initiator concentration, polymerization inhibitor, polymerization inhibitor concentration, etc.), based on a degree of residual vinyl groups after curing the polymeric precursor to form the polymer electrolyte (e.g., NMR, titration using bromine, titration using potassium manganate, ozonolysis, etc.), by combining the above examples and variations, and/or can otherwise be achieved. Relatedly, adhesion of the polymer electrolyte to surfaces and/or components of the battery (e.g., current collector, anode material, cathode material, separator, etc.) can be tuned, for instance, based on an oligomer affinity for the surfaces (e.g., by the inclusion of hydroxyl, sulfonate, thiosulfonate, sulfhydryl, xanthate, phosphate, nitrate, selenol, etc. functional group as a pendant group or side group of the oligomer), based on a monomer affinity (e.g., a monomer that includes hydroxyl, sulfonate, thiosulfonate, sulfhydryl, xanthate, phosphate, nitrate, selenol, silanol, siloxide, siloxane, silyl ether, etc. functional group resulting in the functional group forming a pendant group or side group of the polymer), based on curing conditions (e.g., pressure, temperature, etc.), and/or can otherwise be tuned.

The optional inhibitor can function to control the polymerization (e.g., rate of polymerization, timing of polymerization, extent of crosslinking, etc.). For example, the inhibitor can hinder polymerization from occurring before the polymer electrolyte precursor is added to the battery. Examples of inhibitors include 4-methoxyphenol (MEHQ), monobenzone, hydroquinone, guaiacol, 2-hydroxy-5-methoxybenzaldehyde, 1,2-benzoquinone, 1,4-benzoquinone, 1,4-naphthoquinone, 9,10-anthraquinone, chloranil, quinone methide, p-phenylenediamines, phenothiazine, diethylhydroxylamine, hydroxylhydroxylamine, (2,2,6,6-Tetramethylpiperidin-1-yl)oxyl (TEMPO), 4-hydroxy-TEMPO (TEMPOL), and/or any suitable inhibitor(s) can be used. The concentration of inhibitor is typically less than about 1% (e.g., wt % such as 1 ppb, 10 ppb, 100 ppb, 1 ppm, 10 ppm, 100 ppm, 1000 ppm, values or ranges therebetween) relative to a monomer, oligomer, and/or combined amount of oligomer and monomer. However, the concentration of inhibitor can be greater than 1%.

The initiator can function to start and/or control the polymerization (e.g., rate of polymerization, timing of polymerization, extent of crosslinking, etc.). For example, the initiator can facilitate or start polymerization after the polymer electrolyte precursor is added to the battery (and/or after a treatment begins such as heating the precursor to a threshold temperature, generating radicals using the initiator, illuminating the initiator, electrochemically forming radicals, etc.). Degradation products resulting from decomposition (e.g., thermal decomposition) of the initiator to generate radicals are preferably substantially inert to electrochemical reaction (e.g., within voltage window of the battery, in the electrolyte, etc.). For example, nitrogen can be formed during the radical formation using the initiator (where the nitrogen can be evacuated from the cell). The initiator is preferably stable at room temperature (e.g., does not substantially begin forming radicals at room temperature, room temperature half-life greater than about 12 hours, etc.). However, the initiator can be unstable at room temperature (e.g., where manufacturing, transport, etc. is performed at a temperature below room temperature). Examples of initiators include 2,2'-azobisisobutyronitrile (AIBN), 2,2-Bis(tert-butylperoxy)butane, 1,1-bis(tert-butylperoxy)cyclohexane, 2,2'-azobis[2-(2-imidazolin-2-yl)-propane]dihydrochloride, 2,5-bis(tert-butylperoxy)-2,5-dimethylhexane, 2,5-bis(tert-butylperoxy)-2,5-dimethyl-3-hexyne, bis(1-(tertbutylperoxy)-1-methylethyl)benzene, 1,1-bis(tert-butylperoxy)-3,3,5-trimethylcyclohexane, tert-butyl peracetate, tert-butyl hydroperoxide (TBHP), cumene hydroperoxide, di-tert-butyl peroxide, tert-butyl peroxybenzoate, tert-butylperoxyisopropyl carbonate, dicumyl peroxide, benzoyl peroxide, lauroyl peroxide, 2,4-pentanedione peroxide, peracetic acid, tert-amyl peroxybenzoate, 4,4-azobis(4-cyanovaleric acid), 1,1'-azobis(cyclohexanecarbonitrile) (ABCN or ACHN), ammonium persulfate, potassium persulfate (or other persulfate salts), and/or any suitable initiator can be used. The concentration of initiator is typically between about 0.1% about 10% (e.g., wt % such as 0.1%, 0.2%, 0.3%, 0.5%, 1%, 2%, 2.5%, 3%, 5%, 7%, 7.5%, 9%, 10%, values or ranges therebetween, etc.) relative to a monomer, oligomer, and/or combined amount of oligomer and monomer. However, the concentration of initiator can be less than 0.1% or greater than 10%.

In some variants, the polymer precursor solution can include one or more additive that can improve a viscosity (e.g., lower viscosity), wettability (e.g., increase wettability), stability (e.g., increase a lifetime), cycling performance (e.g., SEI formation, SEI stability, SEI ductility, etc.), and/or otherwise can be included in the precursor. Examples of additives that can be included are: isobornyl acrylate (IBOA), trimethylolpropane triacrylate (TMPTA), tripropylene glycol diacrylate (TPGDA), 1,6-hexanediol diacrylate (HDDA), (hydroxyethyl)methacrylate (HEMA), and/or other suitable acrylates or methacrylates (e.g., acrylic acid, methyl acrylate, ethyl acrylate, 2-chloroethyl vinyl ether acrylate, 2-ethylhexyl acrylate, iso-butyl acrylate, tert-butyl acrylate, iso-decyl acrylate, behenyl acrylate, ethyldiglycol acrylate, heptadecyl acrylate, 4-hydroxybutyl acrylate, hydroxyethylcaprolactone acrylate, lauryl acrylate, 2-propylheptyl acrylate, stearyl acrylate, hydroxylethyl acrylate, phenylacrylate, trimethylolpropane triacrylate, hexanedioldiacrylate, pentaerythritol tetraacrylate, ethyl cyanoacrylate, methyl cyanoacrylate, butyl cyanoacrylate, propylcyanoacrylate, 3-3-dimethylbutyl cyanoacrylate, 2-ethylbutyl cyanoacrylate, 2-ethylhexyl cyanoacrylate, 1-heptyl cyanoacrylate, 2-heptyl cyanoacrylate, 3-heptyl cyanoacrylate, 3-methylbutyl cyanoacrylate, 4-methylpentyl cyanoacrylate, neopentyl cyanoacrylate, octyl cyanoacrylate, 1-pentyl cyanoacrylate, 3-pentyl cyanoacrylate, 2-phenylethyl cyanoacrylate, methyl methacrylate, methacrylic acid, ethyl methacrylate, hydroxypropyl acrylate, hydroxypropyl methacrylate, iso-butyl methacrylate, n-butyl methacrylate, t-butyl methacrylate, hydroxyethyl methacrylate, behenyl methacrylate, behenyl polyethylenglycol methacrylate, cyclohexyl methacrylate, iso-decyl methacrylate, 2-ethylhexyl methacrylate, lauryl methacrylate, methyl polyethyleneglykol methacrylate, stearyl methacrylate, stearyl polyethylenglycol methacrylate, iso-tridecyl methacrylate, ureido methacylate, phenyl methacrylate, etc.) or other additives can be included. Typically, the additives are included in at most a 30% (e.g., by weight, by volume, by stoichiometry, etc.) relative to the oligomer and/or monomer. However, the concentration can be greater than 30%. Note that the concentration of additives can additionally or alternatively be relative to the monomer, liquid (e.g., solvent, electrolyte additives, salts, etc.), initiator, inhibitor, and/or combinations thereof.

The electrolyte (e.g., polymer precursor thereof) is preferably cured (e.g., to form a gel-polymer) in situ (for instance using thermal energy, optical energy, electrochemical energy, UV illumination, electron irradiation, gamma ray irradiation, in a manner as described in U.S. patent application Ser. No. 18/443,716 titled 'GEL ELECTROLYTE COMPOSITION FOR A BATTERY AND A METHOD OF IMPLEMENTATION' filed 16 Feb. 2024 which is incorporated in its entirety by this reference, etc.). However, the electrolyte can be cured in any manner (e.g., ex situ where the cured polymer can be transferred to a battery).

Figure 7:
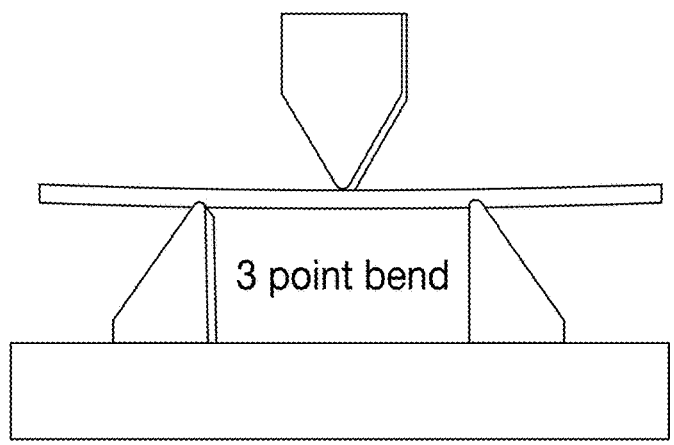
FIG. 7 is a schematic representation of an example of a three point bend test for mechanical properties of a battery cell.

The battery stiffness is typically measured using a three-point bend test (optionally with concurrent charging and/or discharging of the battery to measure electrical properties concurrently with structural testing), as shown for example in FIG. 7. However, the battery stiffness can be measured using any suitable mechanical test(s) (e.g., four-point bend test, diametral compression test, fatigue testing, indentation plastometry, creep testing, Shore durometer hardness testing, bulk modulus testing, shear testing, torsion testing, tensile testing, impact strength test, etc.). The adhesion is typically measured using a peel test (optionally with concurrent charging and/or discharging of the battery to measure electrical properties concurrently with adhesion testing). However, the adhesion can otherwise be measured (e.g., using a knife test, tape test, scrape test, using a tensile test machine, hardness test, etc.).

In a specific example, the flexural modulus can be determined using a 3-point bend data performed within the elastic region (i.e. the region where the material can be deformed and when released will return back to its original configuration). In this specific example, the 3-point bend can include several small displacements (e.g., less than 3% of the support span distance) several times to prove the cell can return to the original configuration. In this specific example the flexural modulus be calculated (e.g., after confirmation that the data is collected in the elastic region) according to $$E = \sqrt{\frac{L^3 F}{4bh^3 d}},$$

where E is the flexural modulus, L is the length of a test bar, F is a load applied on the test bar, d is a distance (e.g., as measured from the initial position) covered by a load F during flexure, b is a width of test bar, and h is a height of test bar. In a specific example, a flexural modulus of a battery cell (e.g., for a battery cell with a nonrigid casing or housing such as a pouch cell) that includes the polymer electrolyte (e.g., a cured polymer electrolyte), can be between about 200 MPa and 20 GPa. However, other flexural modulus could be achieved (e.g., with different compositions of the polymer electrolyte, for different battery sizes, different battery casings, etc.).

Numbered List of Specific Examples

A numbered list of specific examples of the technology described herein are provided below. A person of skill in the art will recognize that the scope of the technology is not limited to and/or by these specific examples.

1. A polymer electrolyte precursor composition comprising: a first oligomer selected from the group of consisting of: polycarbonate amidine acrylate, polyether amidine acrylate, polyester amidine acrylate, polycarbonate polyether amidine acrylate, polycarbonate polyester amidine acrylate, polyether polyester amidine acrylate, polycarbonate polyether polyester amidine acrylate, polyamidine acrylate, polycarbonate polyamidine acrylate, polyether polyamidine acrylate, polyester polyamidine acrylate, polycarbonate polyether polyamidine acrylate, polycarbonate polyester polyamidine acrylate, polyether polyester amidine acrylate, polycarbonate polyether polyester amidine acrylate, polycarbonate amidine methacrylate, polyether amidine methacrylate, polyester amidine methacrylate, polycarbonate polyether amidine methacrylate, polycarbonate polyester amidine methacrylate, polyether polyester amidine methacrylate, polycarbonate polyether polyester amidine methacrylate, polyamidine methacrylate, polycarbonate polyamidine methacrylate, polyether polyamidine methacrylate, polyester polyamidine methacrylate, polycarbonate polyether polyamidine methacrylate, polycarbonate polyester polyamidine methacrylate, polyether polyester amidine methacrylate, polycarbonate polyether polyester amidine methacrylate, polycarbonate imidate acrylate, polyether imidate acrylate, polyester imidate acrylate, polycarbonate polyether imidate acrylate, polycarbonate polyester imidate acrylate, polyether polyester imidate acrylate, polycarbonate polyether polyester imidate acrylate, polyimide acrylate, polycarbonate polyimide acrylate, polyether polyimide acrylate, polyester polyimide acrylate, polycarbonate polyether polyimide acrylate, polycarbonate polyester polyimide acrylate, polyether polyester imidate acrylate, polycarbonate polyether polyester imidate acrylate, polycarbonate imidate methacrylate, polyether imidate methacrylate, polyester imidate methacrylate, polycarbonate polyether imidate methacrylate, polycarbonate polyester imidate methacrylate, polyether polyester imidate methacrylate, polycarbonate polyether polyester imidate methacrylate, polyimide methacrylate, polycarbonate polyimide methacrylate, polyether polyimide methacrylate, polyester polyimide methacrylate, polycarbonate polyether polyimide methacrylate, polycarbonate polyester polyimide methacrylate, polyether polyester imidate methacrylate, polycarbonate polyether polyester imidate methacrylate, polycarbonate ureido acrylate, polyether ureido acrylate, polyester ureido acrylate, polycarbonate polyether ureido acrylate, polycarbonate polyester ureido acrylate, polyether polyester ureido acrylate, polycarbonate polyether polyester ureido acrylate, polyurea acrylate, polycarbonate polyurea acrylate, polyether polyurea acrylate, polyester polyurea acrylate, polycarbonate polyether polyurea acrylate, polycarbonate polyester polyurea acrylate, polyether polyester ureido acrylate, polycarbonate polyether polyester ureido acrylate, polycarbonate ureido methacrylate, polyether ureido methacrylate, polyester ureido methacrylate, polycarbonate polyether ureido methacrylate, polycarbonate polyester ureido methacrylate, polyether polyester ureido methacrylate, polycarbonate polyether polyester ureido methacrylate, polyurea methacrylate, polycarbonate polyurea methacrylate, polyether polyurea methacrylate, polyester polyurea methacrylate, polycarbonate polyether polyurea methacrylate, polycarbonate polyester polyurea methacrylate, polyether polyester ureido methacrylate, polycarbonate polyether polyester ureido methacrylate, polycarbonate urethane acrylate, polyether urethane acrylate, polyester urethane acrylate, polycarbonate polyether urethane acrylate, polycarbonate polyester urethane acrylate, polyether polyester urethane acrylate, polycarbonate polyether polyester urethane acrylate, polyurethane acrylate, polycarbonate polyurethane acrylate, polyether polyurethane acrylate, polyester polyurethane acrylate, polycarbonate polyether polyurethane acrylate, polycarbonate polyester polyurethane acrylate, polyether polyester urethane acrylate, polycarbonate polyether polyester urethane acrylate, polycarbonate urethane methacrylate, polyether urethane methacrylate, polyester urethane methacrylate, polycarbonate polyether urethane methacrylate, polycarbonate polyester urethane methacrylate, polyether polyester urethane methacrylate, polycarbonate polyether polyester urethane methacrylate, polyurethane methacrylate, polycarbonate polyurethane methacrylate, polyether polyurethane methacrylate, polyester polyurethane methacrylate, polycarbonate polyether polyurethane methacrylate, polycarbonate polyester polyurethane methacrylate, polyether polyester urethane methacrylate, polycarbonate polyether polyester urethane methacrylate, polycarbonate acrylate, polyether acrylate, polyester acrylate, polycarbonate polyether acrylate, polycarbonate polyester acrylate, polyether polyester acrylate, polycarbonate polyether polyester acrylate, polyether polyester acrylate, polycarbonate polyether polyester acrylate, polycarbonate methacrylate, polyether methacrylate, polyester methacrylate, polycarbonate polyether methacrylate, polycarbonate polyester methacrylate, polyether polyester methacrylate, polycarbonate polyether polyester methacrylate, polyether polyester methacrylate, and polycarbonate polyether polyester methacrylate; and a second oligomer, that is different from the first oligomer, wherein the second oligomer is selected from the group consisting of: polycarbonate amidine acrylate, polyether amidine acrylate, polyester amidine acrylate, polycarbonate polyether amidine acrylate, polycarbonate polyester amidine acrylate, polyether polyester amidine acrylate, polycarbonate polyether polyester amidine acrylate, polyamidine acrylate, polycarbonate polyamidine acrylate, polyether polyamidine acrylate, polyester polyamidine acrylate, polycarbonate polyether polyamidine acrylate, polycarbonate polyester polyamidine acrylate, polyether polyester amidine acrylate, polycarbonate polyether polyester amidine acrylate, polycarbonate amidine methacrylate, polyether amidine methacrylate, polyester amidine methacrylate, polycarbonate polyether amidine methacrylate, polycarbonate polyester amidine methacrylate, polyether polyester amidine methacrylate, polycarbonate polyether polyester amidine methacrylate, polyamidine methacrylate, polycarbonate polyamidine methacrylate, polyether polyamidine methacrylate, polyester polyamidine methacrylate, polycarbonate polyether polyamidine methacrylate, polycarbonate polyester polyamidine methacrylate, polyether polyester amidine methacrylate, polycarbonate polyether polyester amidine methacrylate, polycarbonate imidate acrylate, polyether imidate acrylate, polyester imidate acrylate, polycarbonate polyether imidate acrylate, polycarbonate polyester imidate acrylate, polyether polyester imidate acrylate, polycarbonate polyether polyester imidate acrylate, polyimide acrylate, polycarbonate polyimide acrylate, polyether polyimide acrylate, polyester polyimide acrylate, polycarbonate polyether polyimide acrylate, polycarbonate polyester polyimide acrylate, polyether polyester imidate acrylate, polycarbonate polyether polyester imidate acrylate, polycarbonate imidate methacrylate, polyether imidate methacrylate, polyester imidate methacrylate, polycarbonate polyether imidate methacrylate, polycarbonate polyester imidate methacrylate, polyether polyester imidate methacrylate, polycarbonate polyether polyester imidate methacrylate, polyimide methacrylate, polycarbonate polyimide methacrylate, polyether polyimide methacrylate, polyester polyimide methacrylate, polycarbonate polyether polyimide methacrylate, polycarbonate polyester polyimide methacrylate, polyether polyester imidate methacrylate, polycarbonate polyether polyester imidate methacrylate, polycarbonate ureido acrylate, polyether ureido acrylate, polyester ureido acrylate, polycarbonate polyether ureido acrylate, polycarbonate polyester ureido acrylate, polyether polyester ureido acrylate, polycarbonate polyether polyester ureido acrylate, polyurea acrylate, polycarbonate polyurea acrylate, polyether polyurea acrylate, polyester polyurea acrylate, polycarbonate polyether polyurea acrylate, polycarbonate polyester polyurea acrylate, polyether polyester ureido acrylate, polycarbonate polyether polyester ureido acrylate, polycarbonate ureido methacrylate, polyether ureido methacrylate, polyester ureido methacrylate, polycarbonate polyether ureido methacrylate, polycarbonate polyester ureido methacrylate, polyether polyester ureido methacrylate, polycarbonate polyether polyester ureido methacrylate, polyurea methacrylate, polycarbonate polyurea methacrylate, polyether polyurea methacrylate, polyester polyurea methacrylate, polycarbonate polyether polyurea methacrylate, polycarbonate polyester polyurea methacrylate, polyether polyester ureido methacrylate, polycarbonate polyether polyester ureido methacrylate, polycarbonate urethane acrylate, polyether urethane acrylate, polyester urethane acrylate, polycarbonate polyether urethane acrylate, polycarbonate polyester urethane acrylate, polyether polyester urethane acrylate, polycarbonate polyether polyester urethane acrylate, polyurethane acrylate, polycarbonate polyurethane acrylate, polyether polyurethane acrylate, polyester polyurethane acrylate, polycarbonate polyether polyurethane acrylate, polycarbonate polyester polyurethane acrylate, polyether polyester urethane acrylate, polycarbonate polyether polyester urethane acrylate, polycarbonate urethane methacrylate, polyether urethane methacrylate, polyester urethane methacrylate, polycarbonate polyether urethane methacrylate, polycarbonate polyester urethane methacrylate, polyether polyester urethane methacrylate, polycarbonate polyether polyester urethane methacrylate, polyurethane methacrylate, polycarbonate polyurethane methacrylate, polyether polyurethane methacrylate, polyester polyurethane methacrylate, polycarbonate polyether polyurethane methacrylate, polycarbonate polyester polyurethane methacrylate, polyether polyester urethane methacrylate, polycarbonate polyether polyester urethane methacrylate, polycarbonate acrylate, polyether acrylate, polyester acrylate, polycarbonate polyether acrylate, polycarbonate polyester acrylate, polyether polyester acrylate, polycarbonate polyether polyester acrylate, polyether polyester acrylate, polycarbonate polyether polyester acrylate, polycarbonate methacrylate, polyether methacrylate, polyester methacrylate, polycarbonate polyether methacrylate, polycarbonate polyester methacrylate, polyether polyester methacrylate, polycarbonate polyether polyester methacrylate, polyether polyester methacrylate, and polycarbonate polyether polyester methacrylate.

2. The polymer electrolyte precursor composition of specific example 1, further comprising at least one monomer selected from the group consisting of: isobornyl acrylate; hexadecyl acrylate, t-butyl acrylate; silsesquioxane acrylates, methacrylic acid, methyl methacrylate, benzyl methacrylate, ethyl methacrylate, isopropyl methacrylate, hydropropyl methacrylate, isobutyl methacrylate, t-butyl methacrylate, cyclohexyl methacrylate, isobornyl methacrylate, phenyl methacrylate, trimethylsilyl methacrylate, T6 silsesquioxane methacrylate, T8 silsesquioxane methacrylate, T10 silsesquioxane methacrylate, T12 silsesquioxane methacrylate, methyl cyanoacrylate, ethyl cyanoacrylate, propyl cyanoacrylate, isopropyl cyanoacrylate, butyl cyanoacrylate, allyl cyanoacrylate, methoxyethyl cyanoacrylate, T6 silsesquioxane cyanoacrylate, T8 silsesquioxane cyanoacrylate, T10 silsesquioxane cyanoacrylate, T12 silsesquioxane cyanoacrylate, acrylamide, N,N dimethyl acrylamide, t-butyl acrylamide, styrene, methylstyrene, dimethylstyrene, trimethylstyrene, t-butyl styrene, ethoxystyrene, acetoxystyrene, methacrylonitrile, and combinations thereof.

3. The polymer electrolyte precursor composition of specific example 1 or 2, wherein an average functionalization of the polymer electrolyte precursor composition is between 1.5 and 2.

4. The polymer electrolyte precursor composition of specific example 2 or 3, wherein polymer electrolyte precursor composition comprises between 70% and 99% by weight of the first oligomer, and between 1 and 20% by weight of the second oligomer, and between 0-10% by weight of the monomer.

5. An electrolyte comprising the polymer electrolyte precursor composition of any of specific examples 1-4, and a plasticizer comprising at least one of a solvent, a salt, or an additive, wherein: the solvent is selected from the group consisting of: ethylene carbonate, fluoroethylene carbonate, propylene carbonate, vinylene carbonate, trimethylene carbonate, 1,2-butylene carbonate, 2,3-butylene carbonate, trifluoropropylene carbonate, methylene ethylene carbonate, dioxazolone, hexahydroxybenzene triscarbonate, ethylenetetracarboxylic dianhydride, lactic acid O-carboxyanhydride, tetrahydroxy-1,4-benzoquinone biscarbonate, di-tert-butyl carbonate, di-tert-butyl decarbonate, diethyl carbonate, diethyl pyrocarbonate, dimethyl carbonate, ethyl methyl carbonate, diallyl carbonate, diphenyl carbonate, methyl(2,2,2-trifluoroethyl) carbonate, bis(2,2,2-trifluoroethyl) carbonate, dimethoxyethane, diethyl ether, tetrahydrofuran (oxolane), tetraethoxymethane, tetramethoxymethane, triethyl orthoacetate, triethyl orthoformate, trimethylorthoformate, 2,2-diethoxytetrahydrofuran, methyl formate, ethyl formate, methyl propionate, methyl butanoate, ethyl formate, ethyl acetate, ethyl propionate, propyl formate, propyl acetate, propyl proprionate, and combinations thereof; the salt is selected from the group consisting of: lithium hexafluorophosphate, lithium hexafluoroarsenate, lithium tetrafluoroborate, lithium chlorate, lithium 2,3,7,8-tetraoxo-1,4,6,9-tetraoxa-5-boraspiro[4.4]nonan-5-uide, lithium difluorophosphate, lithium bis(fluorosulfonyl)imide, lithium bis(trifluoromethanesulfonyl)imide, lithium-cyclo-difluoromethane-1,1-bis(sulfonyl)imide, lithium fluoromalonato(difluoro)borate, lithium trifluoromethanesulfonate, lithium tetraoxo-1,4,6,9-tetraoxa-5-boraspiro[4,4]nonan-5-uide, lithium trifluoro[(trifluoromethansulfonylazanidyl) sulfonyl]methane, lithium nitrate, lithium 2,2-difluoro-4,5-dioxo-1,3,2-dioxaborolane-2-uide, and combinations thereof; and the additive is selected from the group consisting of: fluoroethylene carbonate, trivinylcyclotriboroxane, VC, LiDFOB, LiBOB, sulfone, ethyl methyl sulfone, tetramethyl sulfone, prop-1-ene-1,3-sulfone, 1,3-propane sultone, cyclic sulfate, dioxolone, 5-methyl-4-((trifluoromethoxy)methyl)-1,3-dioxol-2-one, phenylboronic acid glycol ester, 5-methyl-4-((trimethylsilyloxy)methyl)-1,3-dioxol-2-one, trimethylphosphate, triethylphosphate, tributylphosphate, triphenylphosphate, tris(2,2,2-trifluoroethyl)phosphate, methyl P,P-bis(2,2,2-trifluoroethyl)phosphate, trimethylphosphite, tris(2,2,2-trifluoroethyl)phosphite, dimethyl methyl phosphate, diethyl ethylphosphate, bis(2,2,2-trifluoroethyl) methylphosphate, bis(2,2,2-trifluoroethyl) ethylphosphate, hexa(methoxy)cyclotriphosphazene, (ethoxy)pentafluorocyclotriphosphazene, (phenoxy)pentafluorocyclotriphosphazene, and combinations thereof.

6. The electrolyte of specific example 5, wherein the polymer electrolyte precursor composition forms a gel polymer electrolyte after polymerization.

7. A polymer electrolyte precursor composition comprising: at least one oligomer comprising a molecular structure according to one or more of the following molecular structures
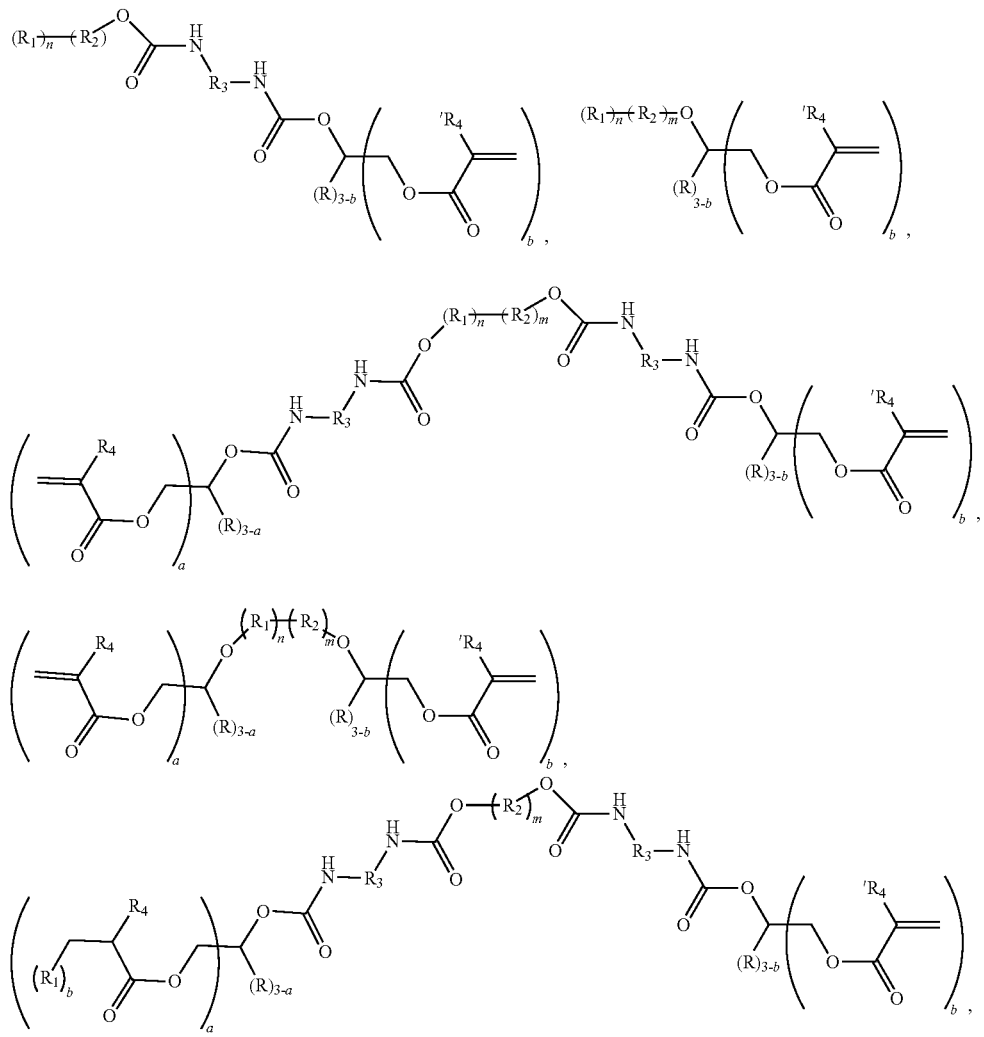
or at least one structure selected from group A and at least one structure selected from B; wherein group A comprises:
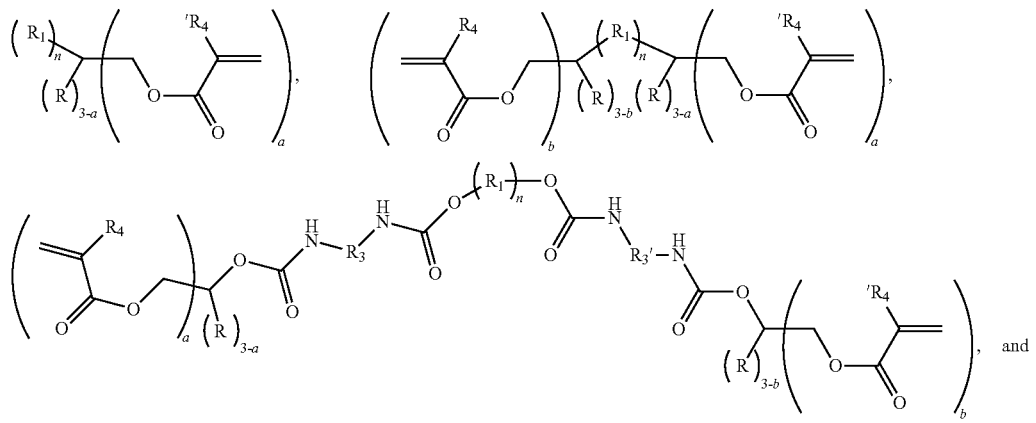
and -continued
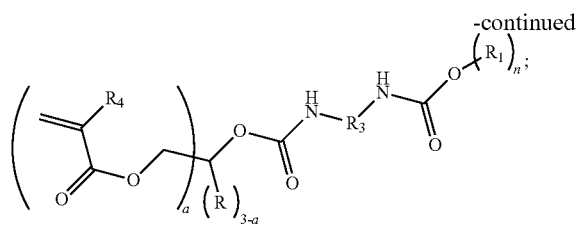
wherein group B comprises:
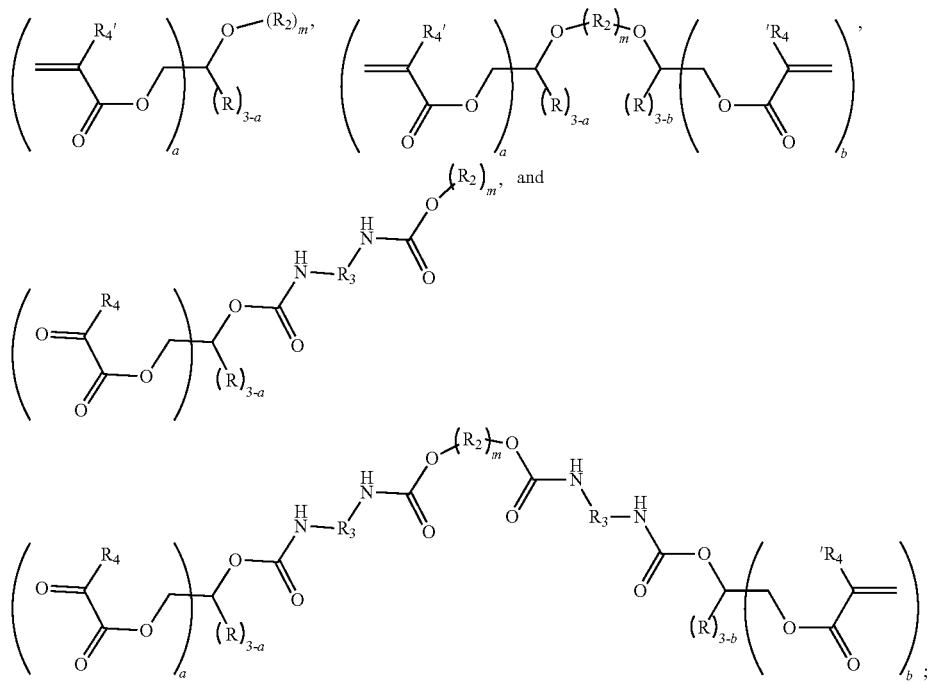
wherein each $R_1$ is selected from the group consisting of:
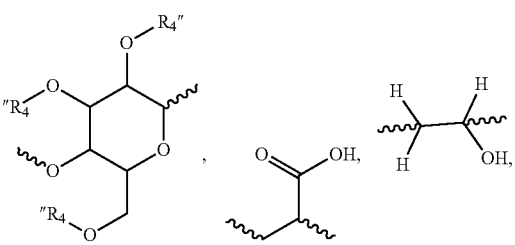
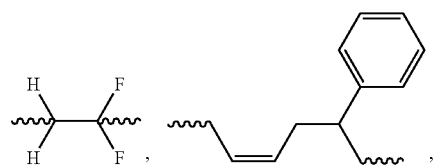
and combinations thereof; wherein each $R_2$ monomer is selected from the group consisting of:
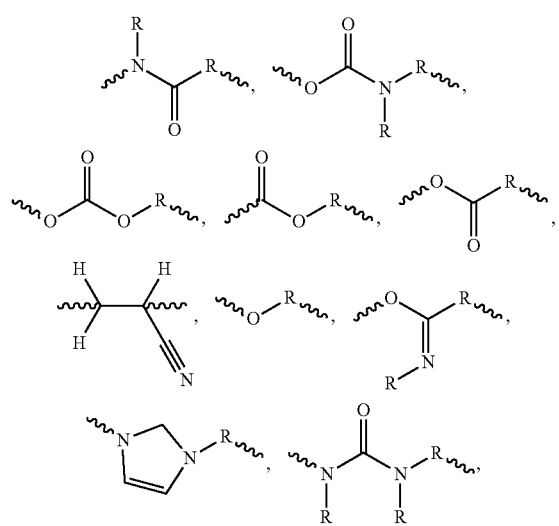

or combinations thereof; wherein R3 and R3' are each independently selected from the group consisting of:

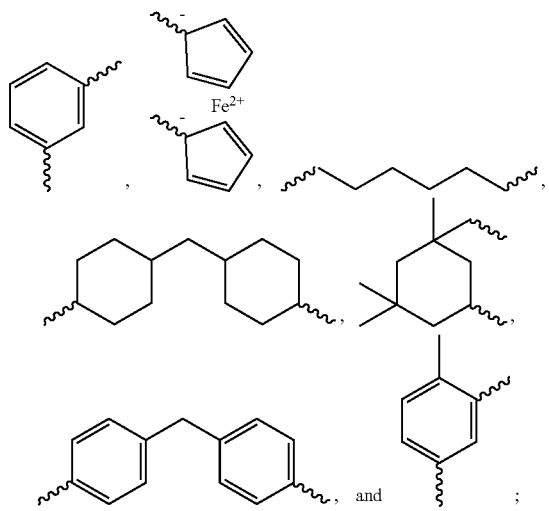

wherein R4 and R4' are each independently selected from the group consisting of hydrogen, methyl, and ethyl; wherein each R is independently selected from the group consisting of: a substituted or unsubstituted alkylene group having 1 to 40 carbon atoms, a substituted or unsubstituted cycloalkylene group having 4 to 40 carbon atoms, and a substituted or unsubstituted arylene group having 6 to 40 carbon atoms; wherein n and m are the number of repeat or individual monomer units, wherein n and m are each independently a value between 1 and 1000; and wherein a and b are each independently between 0 and 3, wherein at least one of a or b is not 0.

8. The polymer electrolyte precursor composition of specific example 7, further comprising at least one monomer selected from the group consisting of: isobornyl acrylate; hexadecyl acrylate, t-butyl acrylate; silsesquioxane acrylates, methacrylic acid, methyl methacrylate, benzyl methacrylate, ethyl methacrylate, isopropyl methacrylate, hydropropyl methacrylate, isobutyl methacrylate, t-butyl methacrylate, cyclohexyl methacrylate, isobornyl methacrylate, phenyl methacrylate, trimethylsilyl methacrylate, T6 silsesquioxane methacrylate, T8 silsesquioxane methacrylate, T10 silsesquioxane methacrylate, T12 silsesquioxane methacrylate, methyl cyanoacrylate, ethyl cyanoacrylate, propyl cyanoacrylate, isopropyl cyanoacrylate, butyl cyanoacrylate, allyl cyanoacrylate, methoxyethyl cyanoacrylate, T6 silsesquioxane cyanoacrylate, T8 silsesquioxane cyanoacrylate, T10 silsesquioxane cyanoacrylate, T12 silsesquioxane cyanoacrylate, acrylamide, N,N dimethyl acrylamide, t-butyl acrylamide, styrene, methylstyrene, dimethylstyrene, trimethylstyrene, t-butyl styrene, ethoxystyrene, acetoxystyrene, methacrylonitrile, and combinations thereof.

9. The polymer electrolyte precursor composition of specific example 7 or 8, wherein an average functionalization of the polymer electrolyte precursor composition is between 1.5 and 2.

10. The polymer electrolyte precursor composition of any of specific examples 7-9, wherein the polymer electrolyte precursor composition forms a gel polymer after polymerization.

11. The polymer electrolyte precursor composition of any of specific examples 7-10, further comprising a second oligomer, distinct from the oligomer, wherein the second oligomer is selected from the group consisting of: polycarbonate amidine acrylate, polyether amidine acrylate, polyester amidine acrylate, polycarbonate polyether amidine acrylate, polycarbonate polyester amidine acrylate, polyether polyester amidine acrylate, polycarbonate polyether polyester amidine acrylate, polyamidine acrylate, polycarbonate polyamidine acrylate, polyether polyamidine acrylate, polyester polyamidine acrylate, polycarbonate polyether polyamidine acrylate, polycarbonate polyester polyamidine acrylate, polyether polyester amidine acrylate, polycarbonate polyether polyester amidine acrylate, polycarbonate amidine methacrylate, polyether amidine methacrylate, polyester amidine methacrylate, polycarbonate polyether amidine methacrylate, polycarbonate polyester amidine methacrylate, polyether polyester amidine methacrylate, polycarbonate polyether polyester amidine methacrylate, polyamidine methacrylate, polycarbonate polyamidine methacrylate, polyether polyamidine methacrylate, polyester polyamidine methacrylate, polycarbonate polyether polyamidine methacrylate, polycarbonate polyester polyamidine methacrylate, polyether polyester amidine methacrylate, polycarbonate polyether polyester amidine methacrylate, polycarbonate imidate acrylate, polyether imidate acrylate, polyester imidate acrylate, polycarbonate polyether imidate acrylate, polycarbonate polyester imidate acrylate, polyether polyester imidate acrylate, polycarbonate polyether polyester imidate acrylate, polyimide acrylate, polycarbonate polyimide acrylate, polyether polyimide acrylate, polyester polyimide acrylate, polycarbonate polyether polyimide acrylate, polycarbonate polyester polyimide acrylate, polyether polyester polyimide acrylate, polycarbonate polyether polyester polyimide acrylate, polycarbonate imidate methacrylate, polyether imidate methacrylate, polyester imidate methacrylate, polycarbonate polyether imidate methacrylate, polycarbonate polyester imidate methacrylate, polyether polyester imidate methacrylate, polycarbonate polyether polyester imidate methacrylate, polyimide methacrylate, polycarbonate polyimide methacrylate, polyether polyimide methacrylate, polyester polyimide methacrylate, polycarbonate polyether polyimide methacrylate, polycarbonate polyester polyimide methacrylate, polyether polyester imidate methacrylate, polycarbonate polyether polyester imidate methacrylate, polycarbonate ureido acrylate, polyether ureido acrylate, polyester ureido acrylate, polycarbonate polyether ureido acrylate, polycarbonate polyester ureido acrylate, polyether polyester ureido acrylate, polycarbonate polyether polyester ureido acrylate, polyurea acrylate, polycarbonate polyurea acrylate, polyether polyurea acrylate, polyester polyurea acrylate, polycarbonate polyether polyurea acrylate, polycarbonate polyester polyurea acrylate, polyether polyester ureido acrylate, polycarbonate polyether polyester ureido acrylate, polycarbonate ureido methacrylate, polyether ureido methacrylate, polyester ureido methacrylate, polycarbonate polyether ureido methacrylate, polycarbonate polyester ureido methacrylate, polyether polyester ureido methacrylate, polycarbonate polyether polyester ureido methacrylate, polyurea methacrylate, polycarbonate polyurea methacrylate, polyether polyurea methacrylate, polyester polyurea methacrylate, polycarbonate polyether polyurea methacrylate, polycarbonate polyester polyurea methacrylate, polyether polyester ureido methacrylate, polycarbonate polyether polyester ureido methacrylate, polycarbonate urethane acrylate, polyether urethane acrylate, polyester urethane acrylate, polycarbonate polyether urethane acrylate, polycarbonate polyester urethane acrylate, polyether polyester urethane acrylate, polycarbonate polyether polyester urethane acrylate, polyurethane acrylate, polycarbonate polyurethane acrylate, polyether polyurethane acrylate, polyester polyurethane acrylate, polycarbonate polyether polyurethane acrylate, polycarbonate polyester polyurethane acrylate, polyether polyester urethane acrylate, polycarbonate polyether polyester urethane acrylate, polycarbonate urethane methacrylate, polyether urethane methacrylate, polyester urethane methacrylate, polycarbonate polyether urethane methacrylate, polycarbonate polyester urethane methacrylate, polyether polyester urethane methacrylate, polycarbonate polyether polyester urethane methacrylate, polyurethane methacrylate, polycarbonate polyurethane methacrylate, polyether polyurethane methacrylate, polyester polyurethane methacrylate, polycarbonate polyether polyurethane methacrylate, polycarbonate polyester polyurethane methacrylate, polyether polyester urethane methacrylate, polycarbonate polyether polyester urethane methacrylate, polycarbonate acrylate, polyether acrylate, polyester acrylate, polycarbonate polyether acrylate, polycarbonate polyester acrylate, polyether polyester acrylate, polycarbonate polyether polyester acrylate, polyether polyester acrylate, polycarbonate polyether polyester acrylate, polycarbonate methacrylate, polyether methacrylate, polyester methacrylate, polycarbonate polyether methacrylate, polycarbonate polyester methacrylate, polyether polyester methacrylate, polycarbonate polyether polyester methacrylate, polyether polyester methacrylate, and polycarbonate polyether polyester methacrylate, and combinations thereof.

12. An electrolyte comprising the polymer electrolyte precursor composition of any of specific examples 7-11, and a plasticizer comprising at least one of a solvent, a salt, or an additive, wherein: the solvent is selected from the group consisting of: ethylene carbonate, fluoroethylene carbonate, propylene carbonate, vinylene carbonate, trimethylene carbonate, 1,2-butylene carbonate, 2,3-butylene carbonate, trifluoropropylene carbonate, methylene ethylene carbonate, dioxazolone, hexahydroxybenzene triscarbonate, ethylenetetracarboxylic dianhydride, lactic acid O-carboxyanhydride, tetrahydroxy-1,4-benzoquinone biscarbonate, di-tert-butyl carbonate, di-tert-butyl decarbonate, diethyl carbonate, diethyl pyrocarbonate, dimethyl carbonate, ethyl methyl carbonate, diallyl carbonate, diphenyl carbonate, methyl(2,2,2-trifluoroethyl) carbonate, bis(2,2,2-trifluoroethyl) carbonate, dimethoxyethane, diethyl ether, tetrahydrofuran (oxolane), tetraethoxymethane, tetramethoxymethane, triethyl orthoacetate, triethyl orthoformate, trimethylorthoformate, 2,2-diethoxytetrahydrofuran, methyl formate, ethyl formate, methyl propionate, methyl butanoate, ethyl formate, ethyl acetate, ethyl propionate, propyl formate, propyl acetate, propyl proprionate, and combinations thereof; the salt is selected from the group consisting of: lithium hexafluorophosphate, lithium hexafluoroarsenate, lithium tetrafluoroborate, lithium chlorate, lithium 2,3,7,8-tetraoxo-1,4,6,9-tetraoxa-5-boraspiro[4.4]nonan-5-uide, lithium difluorophosphate, lithium bis(fluorosulfonyl)imide, lithium bis(trifluoromethanesulfonyl)imide, lithium-cyclo-difluoromethane-1,1-bis(sulfonyl)imide, lithium fluoromalonato(difluoro)borate, lithium trifluoromethanesulfonate, lithium tetraoxo-1,4,6,9-tetraoxa-5-boraspiro[4.4]nonan-5-uide, lithium trifluoro[(trifluoromethansulfonylazanidyl)sulfonyl]methane, lithium nitrate, lithium 2,2-difluoro-4,5-dioxo-1,3,2-dioxaborolane-2-uide, and combinations thereof; and the additive is selected from the group consisting of: fluoroethylene carbonate, trivinylcyclotriboroxane, VC, LiDFOB, LiBOB, sulfone, ethyl methyl sulfone, tetramethyl sulfone, prop-1-ene-1,3-sulfone, 1,3-propane sultone, cyclic sulfate, dioxolone, 5-methyl-4-((trifluoromethoxy)methyl)-1,3-dioxol-2-one, phenyl boronic acid glycol ester, 5-methyl-4-((trimethylsilyloxy)methyl)-1,3-dioxol-2-one, trimethylphosphate, triethylphosphate, tributylphosphate, triphenylphosphate, tris(2,2,2-trifluoroethyl)phosphate, methyl P,P-bis(2,2,2-trifluoroethyl)phosphate, trimethylphosphite, tris(2,2,2-trifluoroethyl)phosphite, dimethyl methyl phosphate, diethyl ethylphosphate, bis(2,2,2-trifluoroethyl) methylphosphate, bis(2,2,2-trifluoroethyl) ethylphosphate, hexa(methoxy)cyclotriphosphazene, (ethoxy)pentafluorocyclotriphosphazene, (phenoxy)pentafluorocyclotriphosphazene, and combinations thereof.

13. A battery comprising the electrolyte of specific example 12 or a polymer formed therefrom, wherein at least one of a cathode or an anode of the battery does not comprise a binder.

14. A battery cell comprising: a cathode comprising a cathode material deposited on a first current collector, wherein the cathode material comprises: a cathode active material selected from the group consisting of lithium nickel cobalt manganese oxide, lithium iron phosphate, lithium manganese iron phosphate, lithium nickel manganese spinel, lithium nickel cobalt aluminium oxide, lithium manganese oxide, lithium cobalt oxide, lithium titanate, lithium transition metal borophosphates, lithium transition metal borosilicates, lithium transition metal borosulfates, lithium vanadium phosphate, and combinations thereof: a first conductive additive selected from the group consisting of carbon black, carbon nanotubes, graphite, graphene, fullerenes, carbon fiber (VGCF), Super P Li, Super C65, Super C45, S-O, KS-6, KS-15, SFG-6, SFG-15, 350G, acetylene black, Kezin black, and combinations thereof: an anode comprising an anode material deposited on a second current collector, wherein the anode material comprises: an anode active material selected from the group consisting of graphite; graphitic carbon; carbon fibers; carbon nanotubes; carbon spheres; carbon nanorods; alloy materials including one or more of: aluminium, tin, magnesium, silver, and antimony; conversion-type materials; silicon; lithium metal; and combinations thereof: a second conductive additive selected from the group consisting of carbon black, carbon nanotubes, graphite, graphene, fullerenes, carbon fiber (VGCF), Super P Li, Super C65, Super C45, S-O, KS-6, KS-15, SFG-6, SFG-15, 350G, acetylene black, Kezin black, and combinations thereof: a separator between the cathode and the anode; and a gel polymer electrolyte comprising: a polymer matrix, a salt, a solvent, and an additive; wherein a flexural modulus of the battery cell is at least 20% greater than a flexural modulus of an identical battery cell that excludes the polymer matrix.

15. The battery cell of specific example 14, wherein the salt is selected from the group consisting of: lithium hexafluorophosphate, lithium hexafluoroarsenate, lithium tetrafluoroborate, lithium chlorate, lithium 2,3,7,8-tetraoxo-1,4,6,9-tetraoxa-5-boraspiro[4.4]nonan-5-uide, lithium difluorophosphate, lithium bis(fluorosulfonyl)imide, lithium bis(trifluoromethanesulfonyl)imide, lithium-cyclo-difluoromethane-1,1-bis(sulfonyl)imide, lithium fluoromalonato (difluoro)borate, lithium trifluoromethanesulfonate, lithium tetraoxo-1,4,6,9-tetraoxa-5-boraspiro[4.4]nonan-5-uide, lithium trifluoro[(trifluoromethansulfonylazanidyl)sulfonyl]methane, lithium nitrate, lithium 2,2-difluoro-4,5-dioxo-1,3,2-dioxaborolane-2-uide, and combinations thereof.

16. The battery cell of specific example 14 or 15, wherein the solvent is selected from: ethylene carbonate, fluoroethylene carbonate, propylene carbonate, vinylene carbonate, trimethylene carbonate, 1,2-butylene carbonate, 2,3-butylene carbonate, trifluoropropylene carbonate, methylene ethylene carbonate, dioxazolone, hexahydroxybenzene triscarbonate, ethylenetetracarboxylic dianhydride, lactic acid O-carboxyanhydride, tetrahydroxy-1,4-benzoquinone biscarbonate, di-tert-butyl carbonate, di-tert-butyl decarbonate, diethyl carbonate, diethyl pyrocarbonate, dimethyl carbonate, ethyl methyl carbonate, diallyl carbonate, diphenyl carbonate, methyl(2,2,2-trifluoroethyl) carbonate, bis(2,2,2-trifluoroethyl) carbonate, dimethoxyethane, diethyl ether, tetrahydrofuran (oxolane), tetraethoxymethane, tetramethoxymethane, triethyl orthoacetate, triethyl orthoformate, trimethylorthoformate, 2,2-diethoxytetrahydrofuran, methyl formate, ethyl formate, methyl propionate, methyl butanoate, ethyl formate, ethyl acetate, ethyl propionate, propyl formate, propyl acetate, propyl proprionate, and combinations thereof.

17. The battery cell of any of specific examples 14-16, wherein the additive is selected from the group consisting of: fluoroethylene carbonate, trivinylcyclotriboroxane, VC, LiDFOB, LiBOB, sulfone, ethyl methyl sulfone, tetramethyl sulfone, prop-1-ene-1,3-sulfone, 1,3-propane sultone, cyclic sulfate, dioxolone, 5-methyl-4-((trifluoromethoxy)methyl)-1,3-dioxol-2-one, phenyl boronic acid glycol ester, 5-methyl-4-((trimethylsilyloxy)methyl)-1,3-dioxol-2-one, trimethylphosphate, triethylphosphate, tributylphosphate, triphenylphosphate, tris(2,2,2-trifluoroethyl)phosphate, methyl P,P-bis(2,2,2-trifluoroethyl)phosphate, trimethylphosphite, tris(2,2,2-trifluoroethyl)phosphite, dimethyl methyl phosphate, diethyl ethylphosphate, bis(2,2,2-trifluoroethyl) methylphosphate, bis(2,2,2-trifluoroethyl) ethylphosphate, hexa(methoxy)cyclotriphosphazene, (ethoxy) pentafluorocyclotriphosphazene, (phenoxy) pentafluorocyclotriphosphazene, and combinations thereof.

18. The battery cell of any of specific examples 14-17, wherein the polymer matrix is formed by curing (e.g., polymerizing) a polymer electrolyte precursor comprising one or more oligomers selected from the group consisting of: polycarbonate amidine acrylate, polyether amidine acrylate, polyester amidine acrylate, polycarbonate polyether amidine acrylate, polycarbonate polyester amidine acrylate, polyether polyester amidine acrylate, polycarbonate polyether polyester amidine acrylate, polyamidine acrylate, polycarbonate polyamidine acrylate, polyether polyamidine acrylate, polyester polyamidine acrylate, polycarbonate polyether polyamidine acrylate, polycarbonate polyester polyamidine acrylate, polyether polyester amidine acrylate, polycarbonate polyether polyester amidine acrylate, polycarbonate amidine methacrylate, polyether amidine methacrylate, polyester amidine methacrylate, polycarbonate polyether amidine methacrylate, polycarbonate polyester amidine methacrylate, polyether polyester amidine methacrylate, polycarbonate polyether polyester amidine methacrylate, polyamidine methacrylate, polycarbonate polyamidine methacrylate, polyether polyamidine methacrylate, polyester polyamidine methacrylate, polycarbonate polyether polyamidine methacrylate, polycarbonate polyester polyamidine methacrylate, polyether polyester amidine methacrylate, polycarbonate polyether polyester amidine methacrylate, polycarbonate imidate acrylate, polyether imidate acrylate, polyester imidate acrylate, polycarbonate polyether imidate acrylate, polycarbonate polyester imidate acrylate, polyether polyester imidate acrylate, polycarbonate polyether polyester imidate acrylate, polyimide acrylate, polycarbonate polyimide acrylate, polyether polyimide acrylate, polyester polyimide acrylate, polycarbonate polyether polyimide acrylate, polycarbonate polyester polyimide acrylate, polyether polyester imidate acrylate, polycarbonate polyether polyester imidate acrylate, polycarbonate imidate methacrylate, polyether imidate methacrylate, polyester imidate methacrylate, polycarbonate polyether imidate methacrylate, polycarbonate polyester imidate methacrylate, polyether polyester imidate methacrylate, polycarbonate polyether polyester imidate methacrylate, polyimide methacrylate, polycarbonate polyimide methacrylate, polyether polyimide methacrylate, polyester polyimide methacrylate, polycarbonate polyether polyimide methacrylate, polycarbonate polyester polyimide methacrylate, polyether polyester imidate methacrylate, polycarbonate polyether polyester imidate methacrylate, polycarbonate ureido acrylate, polyether ureido acrylate, polyester ureido acrylate, polycarbonate polyether ureido acrylate, polycarbonate polyester ureido acrylate, polyether polyester ureido acrylate, polycarbonate polyether polyester ureido acrylate, polyurea acrylate, polycarbonate polyurea acrylate, polyether polyurea acrylate, polyester polyurea acrylate, polycarbonate polyether polyurea acrylate, polycarbonate polyester polyurea acrylate, polyether polyester ureido acrylate, polycarbonate polyether polyester ureido acrylate, polycarbonate ureido methacrylate, polyether ureido methacrylate, polyester ureido methacrylate, polycarbonate polyether ureido methacrylate, polycarbonate polyester ureido methacrylate, polyether polyester ureido methacrylate, polycarbonate polyether polyester ureido methacrylate, polyurea methacrylate, polycarbonate polyurea methacrylate, polyether polyurea methacrylate, polyester polyurea methacrylate, polycarbonate polyether polyurea methacrylate, polycarbonate polyester polyurea methacrylate, polyether polyester ureido methacrylate, polycarbonate polyether polyester ureido methacrylate, polycarbonate urethane acrylate, polyether urethane acrylate, polyester urethane acrylate, polycarbonate polyether urethane acrylate, polycarbonate polyester urethane acrylate, polyether polyester urethane acrylate, polycarbonate polyether polyester urethane acrylate, polyurethane acrylate, polycarbonate polyurethane acrylate, polyether polyurethane acrylate, polyester polyurethane acrylate, polycarbonate polyether polyurethane acrylate, polycarbonate polyester polyurethane acrylate, polyether polyester urethane acrylate, polycarbonate polyether polyester urethane acrylate, polycarbonate urethane methacrylate, polyether urethane methacrylate, polyester urethane methacrylate, polycarbonate polyether urethane methacrylate, polycarbonate polyester urethane methacrylate, polyether polyester urethane methacrylate, polycarbonate polyether polyester urethane methacrylate, polyurethane methacrylate, polycarbonate polyurethane methacrylate, polyether polyurethane methacrylate, polyester polyurethane methacrylate, polycarbonate polyether polyurethane methacrylate, polycarbonate polyester polyurethane methacrylate, polyether polyester urethane methacrylate, polycarbonate polyether polyester urethane methacrylate, polycarbonate acrylate, polyether acrylate, polyester acrylate, polycarbonate polyether acrylate, polycarbonate polyester acrylate, polyether polyester acrylate, polycarbonate polyether polyester acrylate, polyether polyester acrylate, polycarbonate polyether polyester acrylate, polycarbonate methacrylate, polyether methacrylate, polyester methacrylate, polycarbonate polyether methacrylate, polycarbonate polyester methacrylate, polyether polyester methacrylate, polycarbonate polyether polyester methacrylate, polyether polyester methacrylate, and polycarbonate polyether polyester methacrylate; and 19. The battery cell of any of specific examples 14-18, wherein the polymer electrolyte precursor further comprises one or more monomers selected from the group consisting of: isobornyl acrylate; hexadecyl acrylate, t-butyl acrylate; silsesquioxane acrylates, methacrylic acid, methyl methacrylate, benzyl methacrylate, ethyl methacrylate, isopropyl methacrylate, hydropropyl methacrylate, isobutyl methacrylate, t-butyl methacrylate, cyclohexyl methacrylate, isobornyl methacrylate, phenyl methacrylate, trimethylsilyl methacrylate, T6 silsesquioxane methacrylate, T8 silsesquioxane methacrylate, T10 silsesquioxane methacrylate, T12 silsesquioxane methacrylate, methyl cyanoacrylate, ethyl cyanoacrylate, propyl cyanoacrylate, isopropyl cyanoacrylate, butyl cyanoacrylate, allyl cyanoacrylate, methoxyethyl cyanoacrylate, T6 silsesquioxane cyanoacrylate, T8 silsesquioxane cyanoacrylate, T10 silsesquioxane cyanoacrylate, T12 silsesquioxane cyanoacrylate, acrylamide, N,N dimethyl acrylamide, t-butyl acrylamide, styrene, methylstyrene, dimethylstyrene, trimethylstyrene, t-butyl styrene, ethoxystyrene, acetoxystyrene, methacrylonitrile, and combinations thereof.

20. The battery cell of any of specific examples 14-19, wherein the polymer electrolyte precursor further comprises an initiator selected from the group consisting of: 1-1'-azobis (cyclohexanecarbonitrile), 2,2'-azobisisobutyronitrile (AIBN), 2,2-Bis(tert-butylperoxy)butane, 1,1-bis(tert-butylperoxy)cyclohexane, 2,2'-azobis[2-(2-imidazolin-2-yl)-propane]dihydrochloride, 2,5-bis(tert-butylperoxy)-2,5-dimethylhexane, 2,5-bis(tert-butylperoxy)-2,5-dimethyl-3-hexyne, bis(i-(tertbutylperoxy)-1-methylethyl)benzene, 1,1-bis(tert-butylperoxy)-3,3,5-trimethylcyclohexane, tert-butyl peracetate, tert-butyl hydroperoxide (TBHP), cumene hydroperoxide, di-tert-butyl peroxide, tert-butyl peroxybenzoate, tert-butylperoxyisopropyl carbonate, dicumyl peroxide, benzoyl peroxide, lauroyl peroxide, 2,4-pentanedione peroxide, peracetic acid, tert-amyl peroxybenzoate, 4,4-azobis(4-cyanovaleric acid), 1,1'-azobis(cyclohexanecarbonitrile) (ABCN or ACHN), ammonium persulfate, potassium persulfate (or other persulfate salts), lauroyl peroxide, tert-butyl peroxide, tert-butyl peroxybenzoate, benzoyl peroxide (BPO), phenylbis(2,4,6-trimethylbenzoyl)phosphine oxide), 2,2-dimethoxy-2-phenylacetophenone (DMPA), or combinations thereof.

21. The battery cell of specific example 20, wherein the polymer matrix is formed by polymerizing a mixture comprising 50-99.9% by weight of the one or more oligomers, 0-50% by weight of the one or more monomers, and 0.1-10% by weight of the initiator.

22. The battery cell of any of specific examples 14-21, wherein the polymer electrolyte comprises between about 10% and 90% by mass combined of the solvent, the salt, and the additive and wherein the remainder comprises the polymer matrix.

23. The battery cell of any of specific examples 14-22, wherein the cathode material and the anode material each comprise a binder independently selected for the cathode material and the anode material from the group consisting of: carboxymethyl cellulose (CMC), styrene-butadiene rubber (SBR), poly(acrylic acid) (PAA), sodium alginate (SA), polyvinylidene fluoride (PVDF), polyaniline (PANI), poly (9,9-dioctylfluorene-cofluorenone-co-methyl benzoic ester) (PFM), polytetrafluoroethylene (PTFE), poly(ethylene oxide) (PEO), polyvinyl alcohol (PVA), polyacrylonitrile (PAN), sodium carboxymethyl chitosan (CCTS), poly(3,4-ethylenedioxythiophene) polystyrene sulfonate (PEDOT:PSS), 3,4-propylenedioxythiophene (ProDOT), dopamine hydrochloride, polyrotaxanes, polythiophene, or combinations thereof.

24. The battery cell of any of specific examples 14-23, wherein the gel polymer electrolyte has a storage modulus greater than 10 Pa and less than 30000 Pa at 1 Hz frequency at a strain within the linear viscoelastic range of the gel polymer electrolyte.

25. The battery cell of any of specific examples 14-24, wherein the battery cell comprises at most 2.5 g of gel polymer electrolyte per Amp hr of capacity.

26. A polymer electrolyte precursor comprising a copolymer of a binder material (e.g., monomers or oligomers formed thereof for one or more of: PVDF, PAI, CMC, SBR, PAA, SA, PANI, PFM, PTFE, PEO, PVA, PAN, CCTS, PEDOT:PSS, ProDOT, polythiophene, etc.) and an ionically conductive material (e.g., carbonates, esters, ethers, urthenaes, imidates, amidine, urea, hydrogen bond donors, hydrogen bond acceptors, etc.).

27. The polymer electrolyte precursor of specific example 26 wherein the copolymer comprises an acrylate, a methacrylate, an epoxide, a thiol, an imine, or an alkeneyl terminating group.

28. The polymer electrolyte precursor of specific example 26 or 27, comprising a dynamically bonding penultimate terminating group (e.g., amidine, imidate, carbamate, urea, amide, etc.). In some variations, a single penultimate terminating group can be included (e.g., a single penultimate terminating group between the copolymer and the terminating group on each end). In some variations, the penultimate terminating group can be the terminating group.

29. The polymer electrolyte precursor of specific example 27 or 28, wherein the terminating group and/or the penultimate terminating group are the same on both ends of the copolymer.

30. A battery (e.g., battery cell) or battery electrolyte that includes any of the polymer electrolyte precursors of specific examples 1-12 or 26-29.

31. A method for curing (e.g., polymerizing) the polymer electrolyte precursors of any of specific examples 1-13 or 26-29.

32. A battery formed according to specific example 31.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the preceding system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A polymer electrolyte composition comprising:

at least one first polymer comprising a molecular structure according to one or more of the following molecular structures:

a) 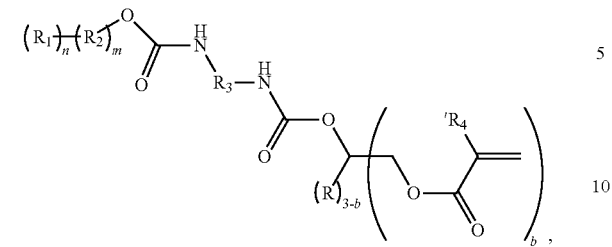
b) 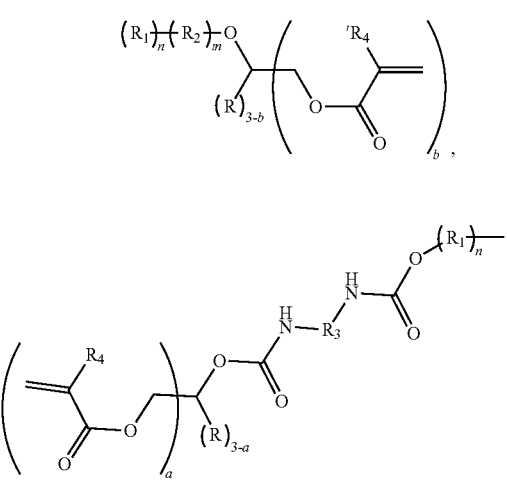
c)
d) 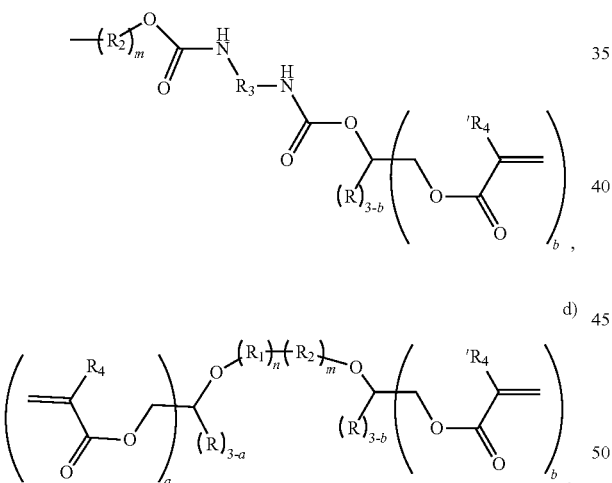
or
e) 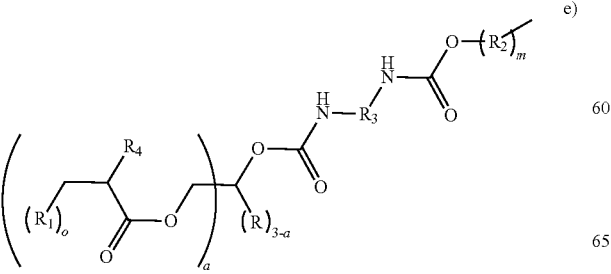
-continued
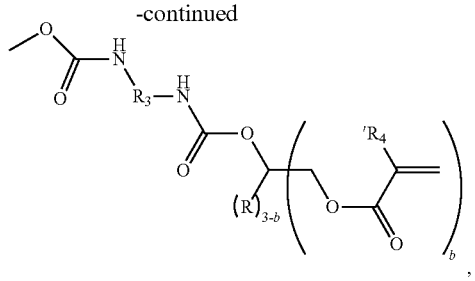
wherein each $R_1$ is selected from the group consisting of:
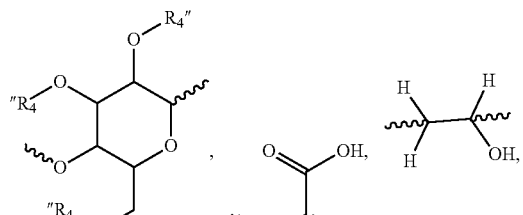
and combinations thereof;
wherein each $R_2$ monomer is selected from the group consisting of:
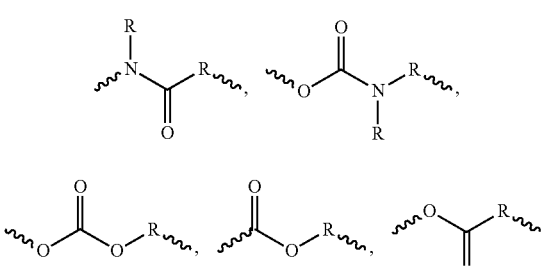
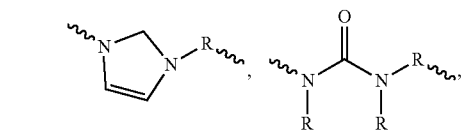
or combinations thereof;
wherein R3 and R3' are each independently selected from the group consisting of:

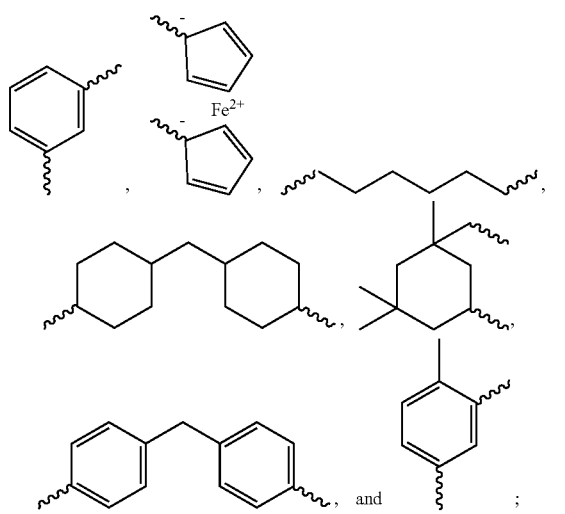

wherein R4 and R4' are each independently selected from the group consisting of hydrogen, methyl, and ethyl;

wherein each R is independently selected from the group consisting of: a substituted or unsubstituted alkylene group having 1 to 40 carbon atoms, a substituted or unsubstituted cycloalkylene group having 4 to 40 carbon atoms, and a substituted or unsubstituted arylene group having 6 to 40 carbon atoms;

wherein n and m are the number of repeat or individual monomer units, wherein n and m are each independently a value between 1 and 1000; and wherein a and b are each independently between 0 and 3, wherein at least one of a or b is not 0; and a plasticizer comprising at least one of a solvent, a salt, or an additive, wherein:

the solvent is selected from the group consisting of: ethylene carbonate, fluoroethylene carbonate, propylene carbonate, vinylene carbonate, trimethylene carbonate, 1,2-butylene carbonate, 2,3-butylene carbonate, trifluoropropylene carbonate, methylene ethylene carbonate, dioxazolone, hexahydroxybenzene triscarbonate, ethylenetetracarboxylic dianhydride, tetrahydroxy-1,4-benzoquinone biscarbonate, di-tert-butyl carbonate, di-tert-butyl dicarbonate, diethyl carbonate, diethyl pyrocarbonate, dimethyl carbonate, ethyl methyl carbonate, diallyl carbonate, diphenyl carbonate, methyl(2,2,2-trifluoroethyl) carbonate, bis(2,2,2-trifluoroethyl) carbonate, dimethoxyethane, diethyl ether, tetrahydrofuran (oxolane), tetraethoxymethane, tetramethoxymethane, triethyl orthoacetate, triethyl orthoformate, trimethylorthoformate, 2,2-diethoxytetrahydrofuran, methyl formate, ethyl formate, methyl propionate, methyl butanoate, ethyl formate, ethyl acetate, ethyl propionate, propyl formate, propyl acetate, propyl propionate, and combinations thereof;

the salt is selected from the group consisting of: lithium hexafluorophosphate, lithium hexafluoroarsenate, lithium tetrafluoroborate, lithium chlorate, lithium 2,3,7,8-tetraoxo-1,4,6,9-tetraoxa-5-boraspiro[4.4]nonan-5-uide, lithium difluorophosphate, lithium bis(fluorosulfonyl)imide, lithium bis(trifluoromethanesulfonyl)imide, lithium-cyclo-difluoromethane-1,1-bis(sulfonyl)imide, lithium fluoromalonato(difluoro)borate, lithium trifluoromethanesulfonate, lithium tetraoxo-1,4,6,9-tetraoxa-5-boraspiro[4,4]nonan-5-uide, lithium trifluoro[(trifluoromethansulfonylazanidyl)sulfonyl]methane, lithium nitrate, lithium 2,2-difluoro-4,5-dioxo-1,3,2-dioxaborolane-2-uide, and combinations thereof; and the additive is selected from the group consisting of: fluoroethylene carbonate, trivinylcyclotriboroxane, VC, LiDFOB, LiBOB, sulfone, ethyl methyl sulfone, tetramethyl sulfone, prop-1-ene-1,3-sulfone, 1,3-propane sultone, cyclic sulfate, lactic acid O-carboxyanhydride, dioxolone, 5-methyl-4-((trifluoromethoxy)methyl)-1,3-dioxol-2-one, phenyl boronic acid glycol ester, 5-methyl-4-((trimethylsilyloxy)methyl)-1,3-dioxol-2-one, trimethylphosphate, triethylphosphate, tributylphosphate, triphenylphosphate, tris(2,2,2-trifluoroethyl)phosphate, methyl P,P-bis(2,2,2-trifluoroethyl)phosphate, trimethylphosphite, tris(2,2,2-trifluoroethyl)phosphite, dimethyl methyl phosphate, diethyl ethylphosphate, bis(2,2,2-trifluoroethyl) methylphosphate, bis(2,2,2-trifluoroethyl) ethylphosphate, hexa(methoxy)cyclotriphosphazene, (ethoxy)pentafluorocyclotriphosphazene, (phenoxy)pentafluorocyclotriphosphazene, and combinations thereof, wherein the additive is between 0.01 weight % and 10 weight % of the polymer electrolyte composition.

2. The polymer electrolyte composition of claim 1, further comprising at least one monomer selected from the group consisting of: isobornyl acrylate, hexadecyl acrylate, t-butyl acrylate, methacrylic acid, methyl methacrylate, benzyl methacrylate, ethyl methacrylate, isopropyl methacrylate, isobutyl methacrylate, t-butyl methacrylate, cyclohexyl methacrylate, isobornyl methacrylate, phenyl methacrylate, styrene, methylstyrene, dimethylstyrene, trimethylstyrene, t-butyl styrene, and combinations thereof.

3. The polymer electrolyte composition of claim 2, wherein an average functionalization of the polymer electrolyte composition is between 1.5 and 2.

4. The polymer electrolyte composition of claim 1, wherein the polymer electrolyte composition forms a gel polymer after polymerization.

5. The polymer electrolyte composition of claim 1, further comprising a second polymer, distinct from the first polymer, wherein the second polymer is selected from the group consisting of: polycarbonate ureido acrylate, polyether ureido acrylate, polyester ureido acrylate, polycarbonate polyether ureido acrylate, polycarbonate polyester ureido acrylate, polyether polyester ureido acrylate, polycarbonate polyether polyester ureido acrylate, polyether polyester ureido methacrylate, polycarbonate polyether polyester ureido methacrylate, polycarbonate ureido methacrylate, polyether ureido methacrylate, polyester ureido methacrylate, polycarbonate polyether ureido methacrylate, polycarbonate polyester ureido methacrylate, polyether polyester ureido methacrylate, polycarbonate polyether polyester ureido methacrylate, polycarbonate urethane acrylate, polyether urethane acrylate, polyester urethane acrylate, polycarbonate polyether urethane acrylate, polycarbonate polyester urethane acrylate, polyether polyester urethane acrylate, polycarbonate polyether polyester urethane acrylate, polycarbonate urethane methacrylate, polyether urethane methacrylate, polyester urethane methacrylate, polycarbonate polyether urethane methacrylate, polycarbonate polyester urethane methacrylate, polyether polyester urethane methacrylate, polycarbonate polyether polyester urethane methacrylate, polyether polyester urethane methacrylate, polycarbonate polyether polyester urethane methacrylate, polycarbonate acrylate, polyether acrylate, polyester acrylate, polycarbonate polyether acrylate, polycarbonate polyester acrylate, polyether polyester acrylate, polycarbonate polyether polyester acrylate, polyether polyester acrylate, polycarbonate polyether polyester acrylate, polycarbonate methacrylate, polyether methacrylate, polyester methacrylate, polycarbonate polyether methacrylate, polycarbonate polyester methacrylate, polyether polyester methacrylate, polycarbonate polyether polyester methacrylate, polyether polyester methacrylate, polycarbonate polyether polyester methacrylate, and combinations thereof.

6. A battery comprising a cathode; an anode; and a polymer electrolyte comprising the polymer electrolyte composition of claim 1, wherein at least one of the cathode or the anode of the battery does not comprise a binder.

* * * * *